United States Patent [19]

Inoue

[11] Patent Number: 5,896,178

[45] Date of Patent: Apr. 20, 1999

[54] METHOD AND SYSTEM FOR CONVERTING VGA SIGNALS TO TELEVISION SIGNALS INCLUDING HORIZONTALLY AVERAGING AND THINNING SCANNING LINES BEFORE VERTICALLY AVERAGING THE SCANNING LINES

[75] Inventor: Tsuyoshi Inoue, Tokyo, Japan

[73] Assignee: Mitsubishi Denki Kabushiki Kaisha, Tokyo, Japan

[21] Appl. No.: 08/942,607

[22] Filed: Oct. 2, 1997

[30] Foreign Application Priority Data

May 7, 1997 [JP] Japan .................. 9-117026

[51] Int. Cl.⁶ ............................... H04N 11/20
[52] U.S. Cl. ............................ 348/453; 348/446
[58] Field of Search ...................... 348/453, 446, 348/910, 441, 455; 345/154, 153

[56] References Cited

U.S. PATENT DOCUMENTS 5,457,498  10/1995  Hori et al. ....................... 348/446
5,526,055  6/1996   Zhang et al. ..................... 348/453
5,642,169  6/1997   Yamamoto et al. ................ 348/453
5,781,241  7/1998   Donovan .......................... 348/453

FOREIGN PATENT DOCUMENTS 8242427  9/1996  Japan.

*Primary Examiner*—Victor R. Kostak
*Attorney, Agent, or Firm*—Leydig, Voit & Mayer

[57] ABSTRACT

A video system conversion method and apparatus for converting RGB signals of a VGA system to signals for a television system such as the NTSC or PAL system and requiring reduced memory capacity. RGB signals are converted to intensity and first and second chrominance signals in scanning lines that are averaged horizontal and vertical directions. The horizontal components of the input RGB video signals are reduced in number and multiplexed, reducing the maximum capacity of a field memory. The respective intensity signal and the chrominance signals are averaged in the horizontal direction. The respective signals are thinned, i.e., reducing in number, and then averaged in the vertical direction. The circuit may include a multiplexer for multiplexing the chrominance signals after they are thinned. The circuit may include a multiplexer for multiplexing the intensity signal, and the first and second chrominance signals after the respective signals are thinned.

20 Claims, 24 Drawing Sheets

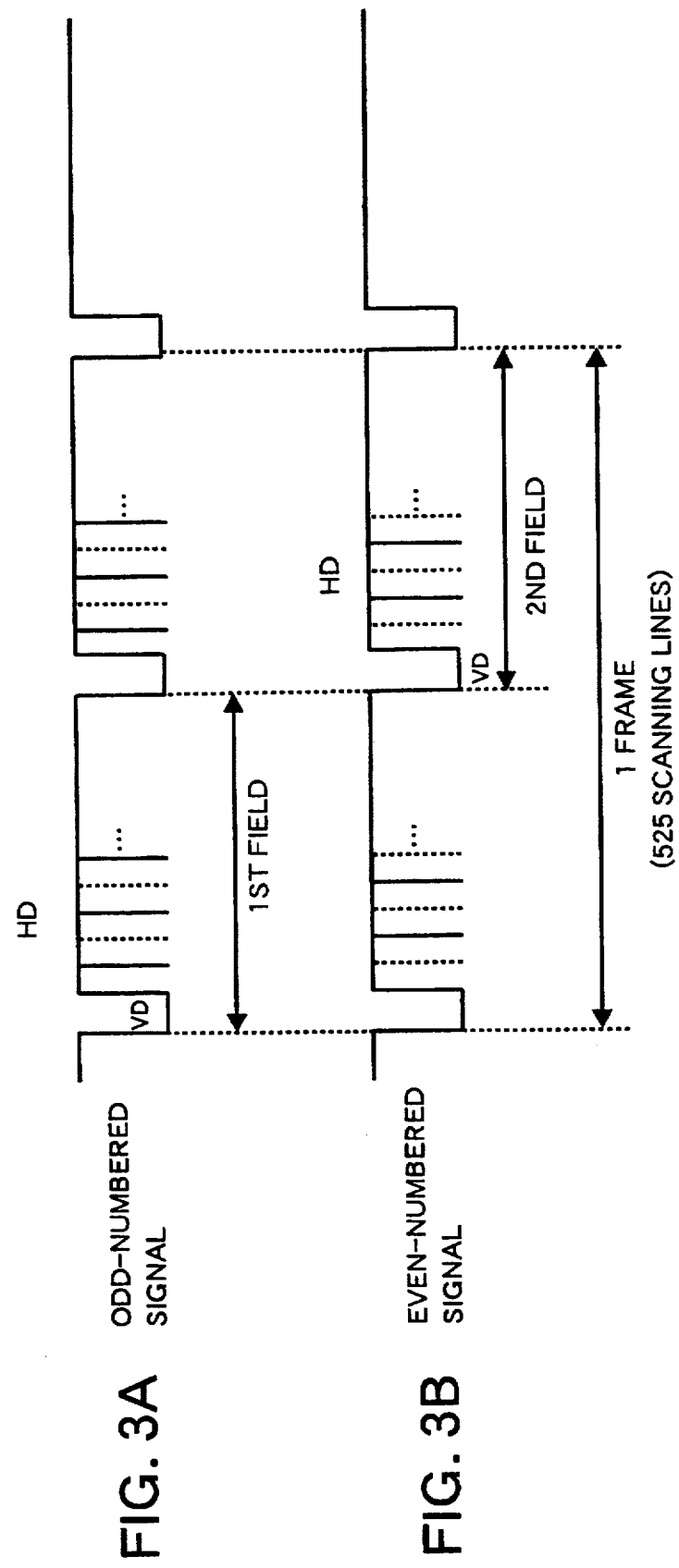

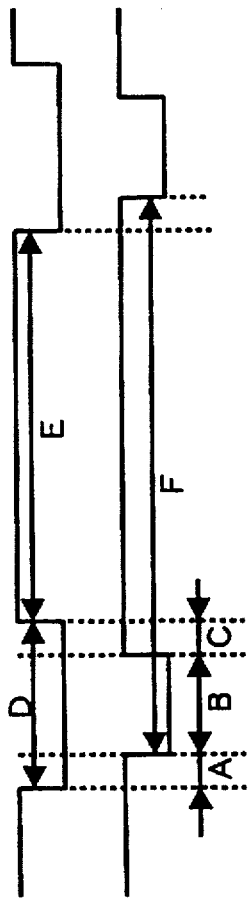
FIG. 4A ○ VIDEO SIGNAL TIMING
FIG. 4B ○ VGA SIGNAL (640×480, NON-INTERLACE)
| | Unit | A | B | C | D | E | F |
|---|---|---|---|---|---|---|---|
| H | μs | 0.636 | 3.813 | 1.907 | 6.356 | 25.422 | 31.778 |
| | DOT NUMBER | 16 | 96 | 48 | 160 | 640 | 800 |
| V | ms | 0.318 | 0.064 | 1.049 | 1.430 | 15.253 | 16.683 |
| | LINE NUMBER | 10 | 2 | 33 | 45 | 480 | 525 |
FREQUENCIES   fH:31.47KHz, fV:59.941Hz
FIG. 4C ○ NTSC SIGNAL (INTERLACE)
| | Unit | A | B | C | D | E | F |
|---|---|---|---|---|---|---|---|
| H | μs | 1.5±0.1 | 4.7±0.1 | 4.7±0.1 | 10.9±0.2 | 52.6 | 63.5 |
| | DOT NUMBER | 20.3 | 63.5 | 63.5 | 147.2 | 714.2 | 857.3 |
| V | LINE NUMBER | 3 | 3 | 14 | 20 | 485 | 525 |
FREQUENCIES   fH:15.734KHz, fV:59.94Hz $Y = A11R + A12G + A13B \cdots (1)$ $B-Y = A21R + A22G + A23B \cdots (2)$ $R-Y = A31R + A32G + A33B \cdots (3)$

| | COEFFICIENTS | CALCULATION METHOD |
|---|---|---|
| A11 | 0.30 | 1/4+1/32+1/64 = 0.296875 |
| A12 | 0.59 | 1/4+1/16+1/32 = 0.59375 |
| A13 | 0.11 | 1/16+1/32+1/64 = 0.109375 |
| A21 | −0.3 | −1/4−1/32−1/64 = −0.296875 |
| A22 | −0.59 | −1/4−1/16−1/32 = −0.59375 |
| A23 | 0.89 | 1/2+1/4+1/8+1/64 = 0.890625 |
| A31 | 0.7 | 1/2+1/8+1/16+1/64 = 0.703125 |
| A32 | −0.59 | −1/4−1/16−1/32 = −0.59375 |
| A33 | −0.11 | −1/16−1/32−1/64 = −0.109375 |

FIG. 6

FIG. 7A INPUT DATA R
FIG. 7B INPUT DATA G
FIG. 7C INPUT DATA B
FIG. 7D OUTPUT DATA Y
FIG. 7E OTUPUT DATA (B-Y)
FIG. 7F OUTPUT DATA (R-Y)

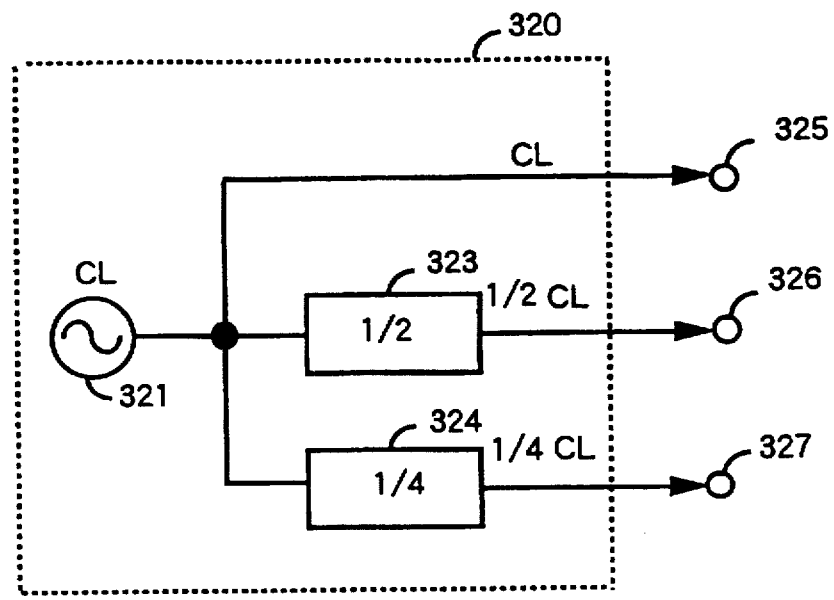
FIG. 9A
FIG. 9B    CL
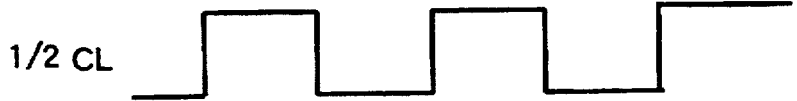
FIG. 9C    1/2 CL
FIG. 9D    1/4 CL

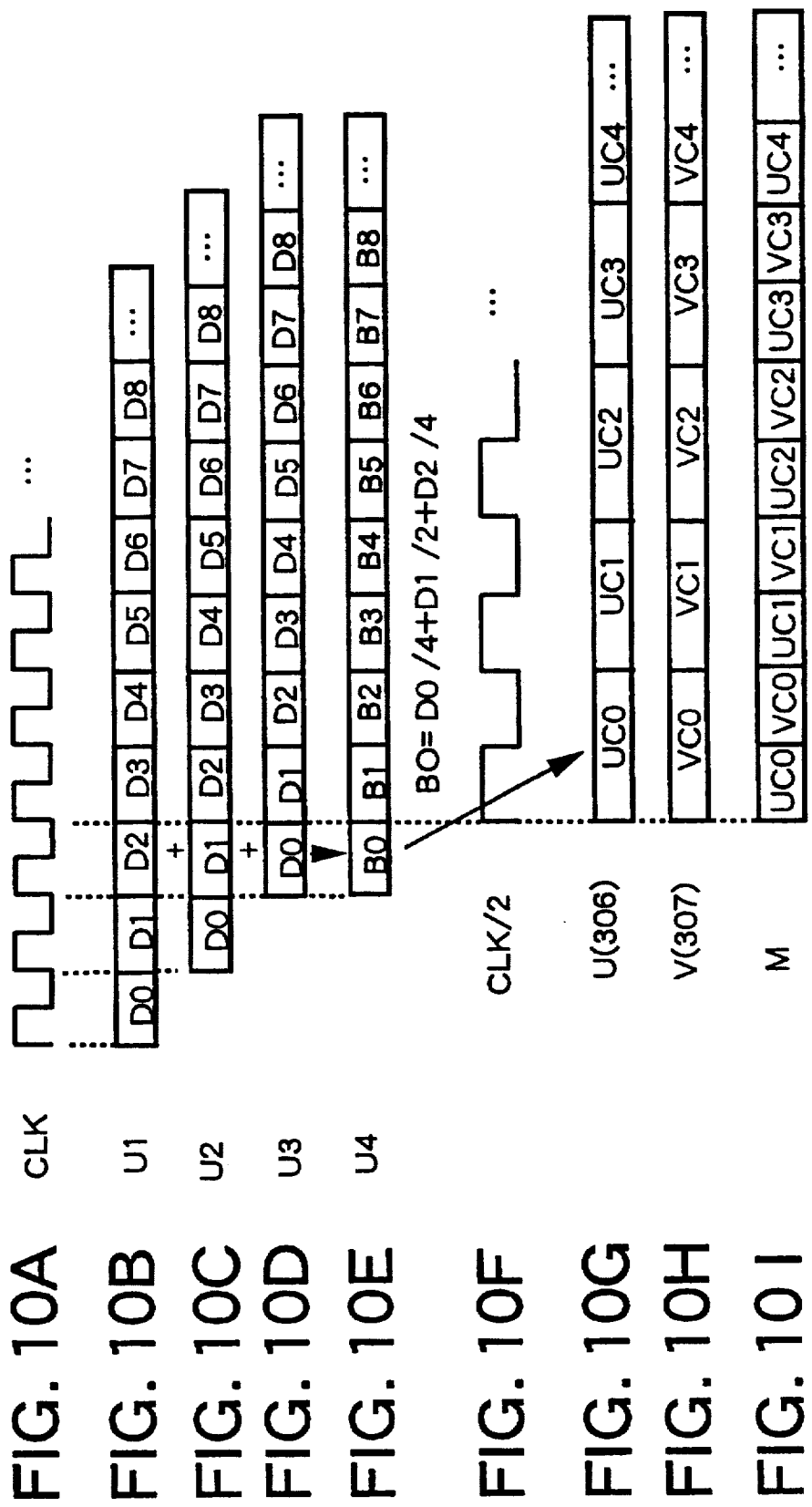

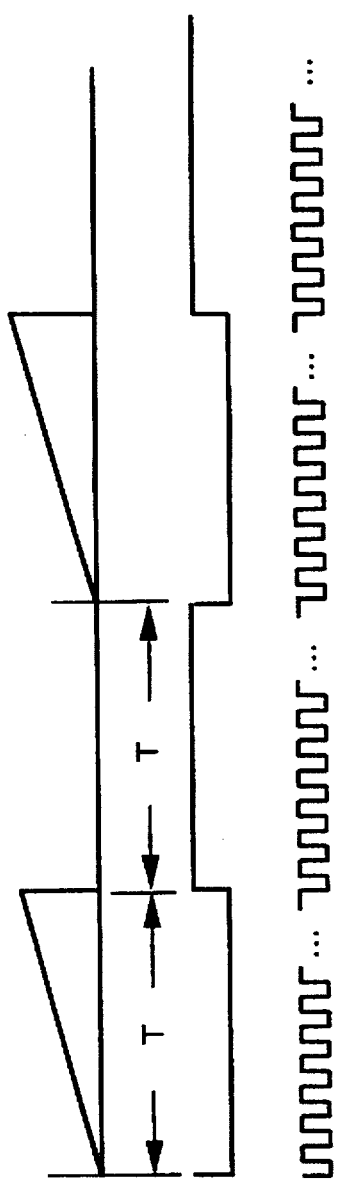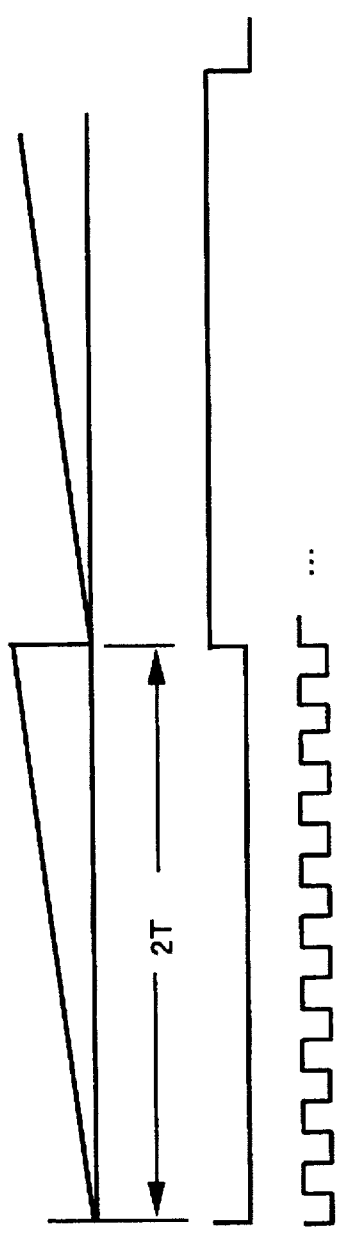
FIG. 13A WRITING DATA
FIG. 13B WINB
FIG. 13C WCLK
FIG. 13D READOUT DATA
FIG. 13E RINB
FIG. 13F RCLK

METHOD AND SYSTEM FOR CONVERTING VGA SIGNALS TO TELEVISION SIGNALS INCLUDING HORIZONTALLY AVERAGING AND THINNING SCANNING LINES BEFORE VERTICALLY AVERAGING THE SCANNING LINES

BACKGROUND OF THE INVENTION

1. Field of the Invention

The invention relates to a video system conversion method and circuit. More particularly, it relates to a video system conversion method and circuit for converting a signal of one video system to a signal of another video system. Still more particularly, the present invention relates to a video system conversion method and circuit for converting a signal produced in an RGB video system, which is used in personal computers, to an NTSC signal, which is used for television.

2. Description of the Prior Art

Recent video display technology has made it possible to display the video data of a personal computer on a screen of a television receiver. The scanning system (Variable Graphics Array method, referred to as "VGA" below) used for a personal computer is different in a manner discussed below from television systems (there are two television systems, the NTSC system and the PAL system; the NTSC system is used for the explanation below). In order to display the video data according to two different systems, the scanning system used in a personal computer and the system used in a television, a conversion of the signals is necessary. The difference between the scanning system for a personal computer display and that for a television system is briefly explained below. In the scanning system used for a personal computer, the video data are sequentially scanned and displayed from the top line to the bottom line, from the left to the right, in respective lines on the display. On the other hand, in the scanning system used for a television, the video data are scanned by skipping every other line, which is referred to as interlaced scanning. In this interlaced scanning system, odd-numbered first field scanning lines (the first line, third line, fifth line, . . . , the five-hundred-and-twenty-fifth line) of the 525 lines are firstly displayed on the screen, then, even-numbered second field scanning lines (the second line, fourth line, sixth line, . . . , five-hundred-twenty-fourth line) are secondly displayed on the screen.

FIG. 24 is a conceptual drawing showing the conversion of video data from the VGA system to the NTSC system. In FIG. 24, the left column shows scanning in the VGA system, and the right column shows scanning in the NTSC system. In order to convert the video data of the VGA system to that of the NTSC system, only the odd-numbered scanning lines in the first VGA screen are used as the scanning lines of the first field in the NTSC system, and the even-numbered scanning lines in the second VGA screen are used as the scanning lines of the second field in the NTSC system. In other words, two screens of the VGA system are used to construct one screen in the NTSC system.

FIG. 23 shows a conventional video system conversion circuit disclosed in Laid-open Japanese patent application No. 8-242427. In FIG. 23, input RGB signals of the VGA system are converted into an intensity signal Y, and chrominance signals (B-Y) and (R-Y) in the NTSC system. The chrominance signals can be represented in three systems: a system which uses an I signal and a Q signal, a system which uses a U signal and a V signal, and finally the system which uses an intensity signal Y, and chrominance signals (B-Y) and (R-Y) which is mentioned above. These three systems are not substantially different from each other, and the only difference is in the calculation factors used for calculating the chrominance signals from RGB signals. The present invention may be used for any of these three systems of representation of the chrominance signals. Although the invention is explained below using the intensity signal Y and the chrominance signals (B-Y) and (R-Y) consistently, the present invention may be used for the other two systems in exactly the same manner. The circuit of FIG. 23 includes input terminals 101, 102, and 103 for receiving RGB signals of the VGA system, and these input terminals receive an R signal (red signal), a G signal (green signal), and a B signal (blue signal), respectively. RGB signals comprise one pixel with three signals. Since the respective R signal, G signal, and B signal contain intensity components and chrominance components, the data include more than the signals of the NTSC system. An analog-to-digital converter 100 converts the respective analog RGB signals to digital data. A matrix converter 200 receives the respective digital RGB signals which have been converted from analog form to digital data, and output an intensity signal Y, and two chrominance signals (B-Y) and (R-Y), which are signals used in the NTSC system (or the PAL system) for television.

A vertical filter circuit 400 receives the horizontal scanning lines of the intensity signal Y of the NTSC system from the matrix converter 200, averages the intensity signal Y and outputs the averaged intensity signal Y for the NTSC system. A vertical filter circuit 400 further includes a horizontal filter circuit 420 and a selector 350. Delay memories 401 and 407 delay the respective averaged scanning lines of the intensity signal Y in the NTSC system by one clock cycle. An adder 402 adds three signals of the NTSC system, that is, the current intensity signal Y (=Y1), the intensity signal Y2 which has been delayed in the delay memory 401, and the intensity signal Y3 which has been delayed by two clock cycles by the delay memory 407. The adder averages the sum of the three signals.

The horizontal filter circuit 420 averages the chrominance signals (B-Y) and (R-Y) of the NTSC system in the horizontal direction. The horizontal filter circuit 420 averages a plurality of bits comprising the chrominance signals (B-Y) and (R-Y) of the NTSC system in the horizontal direction. The purpose of this averaging process is to suppress uneven color occurring in the horizontal direction. The selector 350 selects and outputs one of the averaged chrominance signals (B-Y) and (R-Y). A field memory 500 stores the respective intensity signal Y and chrominance signal C of the NTSC system, which have been output from the adder 402 and the selector 350, respectively, for one line. A write controlling circuit 550 controls writing of the intensity signal Y and the chrominance signal C of the NTSC system sent from the vertical filter 400 to the field memory 500. A read controlling circuit 560 controls reading of the intensity signal Y and the chrominance signal C of the NTSC system from the field memory 500. A conversion circuit 650 generates an intensity signal Y and the chrominance signals (B-Y) and (R-Y) from the intensity signal Y and the chrominance signal C output from the field memory 500. A digital-to-analog (D/A) conversion circuit 700 converts the digital intensity signal Y and the chrominance signals (B-Y) and (R-Y), received from the conversion circuit 650, to analog form. The results of this digital-to-analog conversion of the intensity signal Y, and the chrominance signals (B-Y) and (R-Y) of the NTSC system are provided to the television set. In this manner, the RGB signals in the VGA system are converted to the intensity signal Y and the chrominance signals (B-Y) and (R-Y) of the NTSC system, and the video data is displayed on the television set.

The operation of a conventional video system conversion circuit is explained below. In the video system conversion circuit constructed in the above-explained manner, the R signal (red signal), the G signal (green signal), and the B signal (blue signal) are input to the RGB input terminals 101, 102, and 103, respectively, of the analog-to-digital converter 100. The analog-to-digital converter 100 converts the respective analog signals into digital signals, and provides the digital signals to the matrix converter 200. The matrix converter 200 converts the respective RGB signals into the intensity signal Y and the two chrominance signals (B-Y) and (R-Y) of the NTSC system (or the PAL system), which is for the use in the television. The respective converted signals are output to the vertical filter circuit 400.

The intensity signal Y is input to the vertical filter circuit 400 from the matrix converter 200, and the intensity signal Y1 (=Y) is applied to the adder 402. The delay memory 401 delays the intensity signal Y1 by one clock cycle to generate the intensity signal Y2. The delay memory 407 delays the intensity signal Y2 by one clock cycle to generate the intensity signal Y3. The adder 402 adds these three intensity signals Y1, Y2, and Y3, and averages of the three intensity signals. The averaged intensity signal is delayed, and output as intensity signal Y. The chrominance signals (B-Y) and (R-Y) are input from the matrix converter 200 to the horizontal filter circuit 420. The horizontal filter circuit 420 averages of the respective input chrominance signals, and the results are output. The selector 350 selects one of the averaged chrominance signals (B-Y) and (R-Y) of the NTSC system which are input from the horizontal filter circuit 420, and the selected signal is output as a chrominance signal C.

The intensity signal Y and the chrominance signal C of the NTSC system are output from vertical filter circuit 400, and input to the field memory 500. The input signals are stored in the respective 1 H line memories. The writing of the intensity signal Y and the chrominance signal C of the NTSC system are performed under the control of the write controlling circuit 550. The written signals are read from the field memory 500 under the control of the read controlling circuit 560. The write controlling circuit 550 operates synchronously with a writing signal, and the read controlling circuit 560 operates by a read signal synchronously with the television signal.

The intensity signal Y and the chrominance signal C of the NTSC system are read out from the field memory 500, and input to the conversion circuit 650. The conversion circuit 650 converts the intensity signal Y and the chrominance signal C to the intensity signal Y and the chrominance signals (B-Y) and (R-Y), and the converted signals are output to the digital-to-analog conversion circuit 700. The digital-to-analog conversion circuit 700 converts the input digital signals into analog form. The converted intensity signal Y and the chrominance signals (B-Y) and (R-Y), which have been converted from the digital data to analog form are provided to the television set, and the television set displays these signals on the screen.

In the conventional video system conversion circuit as explained so far, since no thinning process has been performed on the intensity information Y and the chrominance signal C, or the intensity signal Y and the chrominance signals (B-Y) and (R-Y) in the horizontal direction, it is necessary to provide a field memory corresponding to one full line. Therefore, a large capacity field memory has been necessary so far.

SUMMARY OF THE INVENTION

It is an object of the present invention to provide a video system conversion circuit for thinning the scanning lines in the horizontal direction after averaging the scanning lines in the horizontal direction, and then for averaging the scanning lines in the vertical direction.

According to one aspect of the invention, a video system conversion method converts VGA signals to television signals including converting RGB signals to an intensity signal, a first chrominance signal and a second chrominance signal, and averages the scanning lines in a horizontal direction, and then in a vertical direction.

According to another aspect of the invention, after the scanning lines are averaged in the horizontal direction, the video system conversion method thins scanning lines of the first chrominance signal and the second chrominance signal, and then averages the first chrominance signal and the second chrominance signal in the vertical direction.

According to a further aspect of the invention, after the scanning lines are averaged in the horizontal direction, the video system conversion method thins scanning lines of the intensity signal, the first chrominance signal and the second chrominance signal, and then averages the intensity signal, the first chrominance signal, and the second chrominance signal in the vertical direction.

According to a still further aspect of the invention, a video system conversion circuit converts VGA signals to television signals including converting RGB signals to an intensity signal, a first chrominance signal and a second chrominance signal. After the RGB signals are converted to the intensity signal, the first chrominance signal and the second chrominance signal, the scanning lines are averaged in a horizontal direction, and then averaged in a vertical direction. The horizontal averaging circuit for averaging horizontal scanning lines comprises three set of (a) a first delay circuit for delaying the intensity signal by one clock cycle, (b) a second delay circuit for delaying the output signal from the first delay circuit by a second clock cycle, (c) an adder for adding the input intensity signal, the intensity signal delayed by the first delay circuit, and the intensity signal delayed by the second delay circuit, and for outputting the result as an averaged output.

BRIEF DESCRIPTION OF THE DRAWINGS

FIGS. 3A and 3B show signal waveforms in the NTSC system.

FIGS. 4A–4C show timing of video signals.

FIG. 6 shows general formulas for generating the intensity signal Y and the chrominance signals (B-Y) and (R-Y) of the NTSC system from the RGB signals, and the coefficients A11–A33 used in the formulas.

FIG. 9A show a horizontal conversion ratio setting circuit.

FIGS. 9B–9D show a clock waveforms generated in horizontal conversion ratio setting circuit.

FIGS. 10A–10I show signal flows in the circuit of FIG. 8.

FIGS. 13A–13F are timing charts showing relationships between writing of data and readout of data.

DETAILED DESCRIPTION OF THE PREFERRED EMBODIMENTS

Embodiment 1

Figure 1:
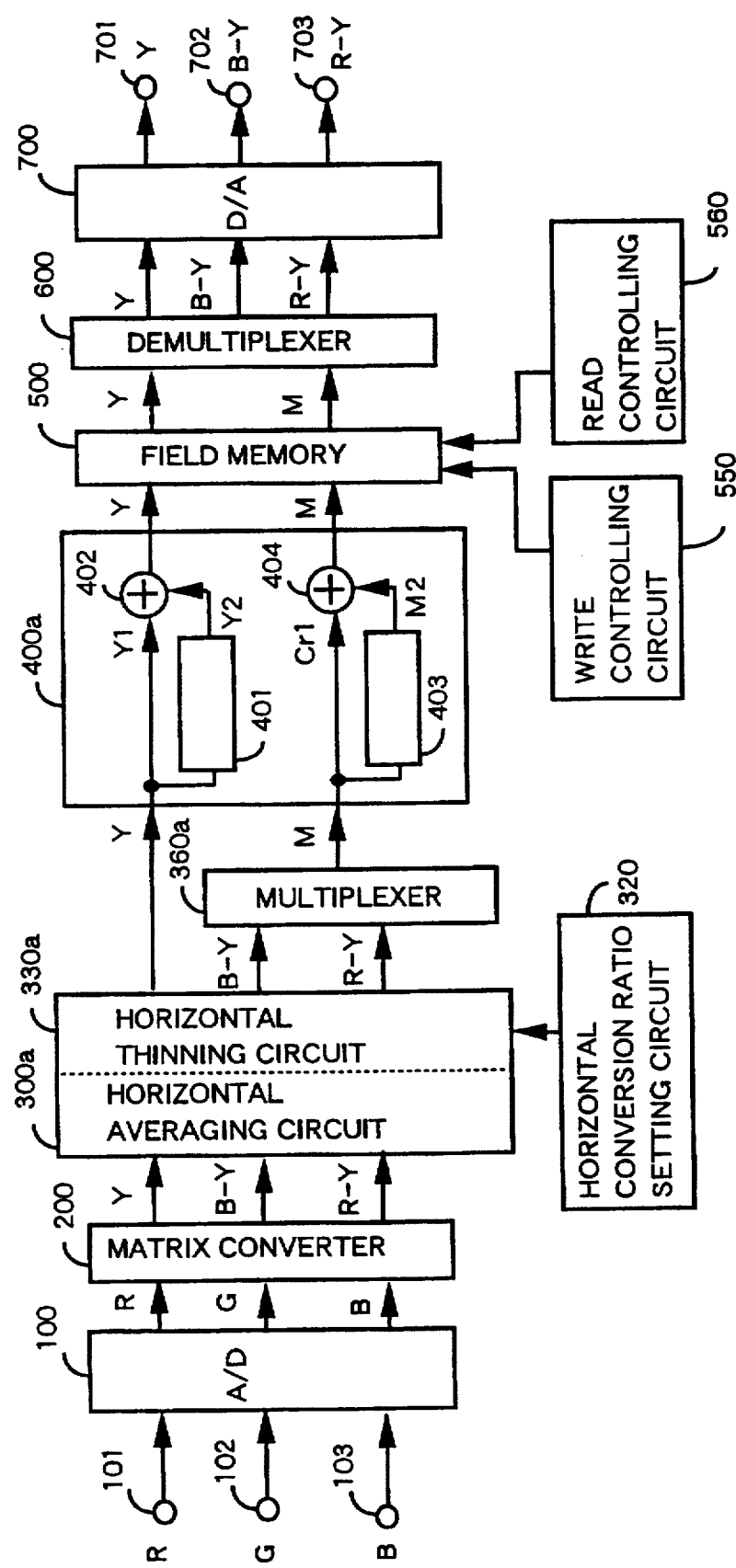
FIG. 1 shows a video system conversion circuit according to a first embodiment of the present invention.

FIG. 1 shows a video system conversion circuit according to a first embodiment of the present invention. The circuit of FIG. 1 includes RGB input terminals 101, 102, and 103, an analog-to-digital converter 100, and a matrix converter 200. The input terminals 101, 102, and 103 respectively receive an R signal (red signal), a G signal (green signal), and a B signal (blue signal) of the VGA system. The analog-to-digital converter 100 converts the respective RGB signals from analog form into digital data. The matrix converter 200 receives the respective A/D converted digital RGB signals, and outputs an intensity signal Y and two chrominance signals (B-Y) and (R-Y), which are signals of the NTSC system (or the PAL system) for use in television.

The circuit of FIG. 1 further includes a horizontal averaging circuit 300a, a horizontal thinning circuit 330a, a horizontal conversion ratio setting circuit 320, and a multiplexer 360a. The horizontal averaging circuit 300a receives as inputs the intensity signal Y and the chrominance signals (B-Y) and (R-Y) which have been converted into the NTSC system from the matrix converter 200 and averages the horizontal scanning lines. The horizontal thinning circuit 330a thins out the horizontal scanning lines contained in the chrominance signals (B-Y) and (R-Y). The horizontal conversion ratio setting circuit 320 provides a horizontal conversion ratio to the horizontal thinning circuit 330a. The horizontal thinning circuit 330a and the horizontal conversion ratio setting circuit 320 are described below in further detail. The multiplexer 360a multiplexes the chrominance signals (B-Y) and (R-Y), which are for the NTSC system, received from the horizontal thinning circuit 330a.

The circuit of FIG. 1 still further includes a vertical filter circuit 400a, which includes delay memories 401 and 403, and adders 402 and 404. The vertical filter circuit 400a averages the intensity signal Y, which is input from the horizontal averaging circuit 300a, and the multiplexed chrominance signal M, which is input from the multiplexer 360a, respectively, and outputs an averaged intensity signal Y and a multiplexed chrominance signal M in the NTSC system. The delay memory 401 delays the scanning lines of the averaged intensity signal Y (=Y1) of the NTSC system by one clock cycle. The adder 402 adds the received current intensity signal Y1 of the NTSC system to the intensity signal Y2, which is one clock cycle behind from the intensity signal Y1 since the signal has been delayed by the delay memory 401, and averages the two signals. The delay memory 403 delays the scanning lines of the averaged chrominance signal C of the NTSC system by one clock cycle. The adder 404 adds the received current chrominance signal M to the chrominance signal M2, which is one clock cycle behind from the signal M since the signal has been delayed in the delay memory 403, and averages the two signals.

The circuit of FIG. 1 still further includes a field memory 500, a write controlling circuit 550, a read controlling circuit 560, a demultiplexer 600, and a digital-to-analog (D/A) conversion circuit. The field memory 500 stores the intensity signal Y, which is output from the vertical filter circuit 400a, and the multiplexed chrominance signal M, both of the NTSC system, respectively, for one line. The write controlling circuit 550 controls storing of the intensity signal Y, which is input from the vertical filter circuit 400a, and the multiplexed chrominance signal M, both of the NTSC system, to the field memory 500. The read controlling circuit 560 controls reading of the intensity signal Y and the multiplexed chrominance signal M of the NTSC system that have been stored in the field memory 500. The demultiplexer 600 generates the intensity signal Y and the chrominance signals (B-Y) and (R-Y) from the intensity signal Y and the multiplexed chrominance signal M. The digital-to-analog converter (D/A) converter 700 converts the digital intensity signal Y and the digital chrominance signals (B-Y) and (R-Y) into the analog form. The converted analog intensity signal Y and the analog chrominance signals (B-Y) and (R-Y) of the NTSC system are provided to a television set. In this manner, the RGB signals of the VGA system are converted to the intensity signal Y and the chrominance signals (B-Y) and (R-Y) of the NTSC system for displaying the signals on the television screen.

The operation of the video system conversion circuits is described below. In FIG. 1, the R signal (red signal), G signal (green signal), and B signal (blue signal) input to the respective RGB input terminals 101, 102, and 103 are provided to the analog-to-digital converter 100, and are converted from analog form into digital data. The converted RGB signals are input to the matrix converter 200, and the matrix converter 200 converts the respective RGB signals into the intensity signal Y and two chrominance signals (B-Y) and (R-Y) of the NTSC system (or the PAL system), which are used for television display.

As described above, the chrominance signals can be represented in three systems: a system which uses an I signal and a Q signal; a system which uses a U signal and a V signal; and finally the system which uses an intensity signal Y, and chrominance signals (B-Y) and (R-Y) which is mentioned above. These three systems are not substantially different from each other, and the only difference is in the calculation factors used for calculating the chrominance signals from RGB signals. The present invention may be used in any of these three systems for representation of the chrominance signals.

Figures 2A, 2B:
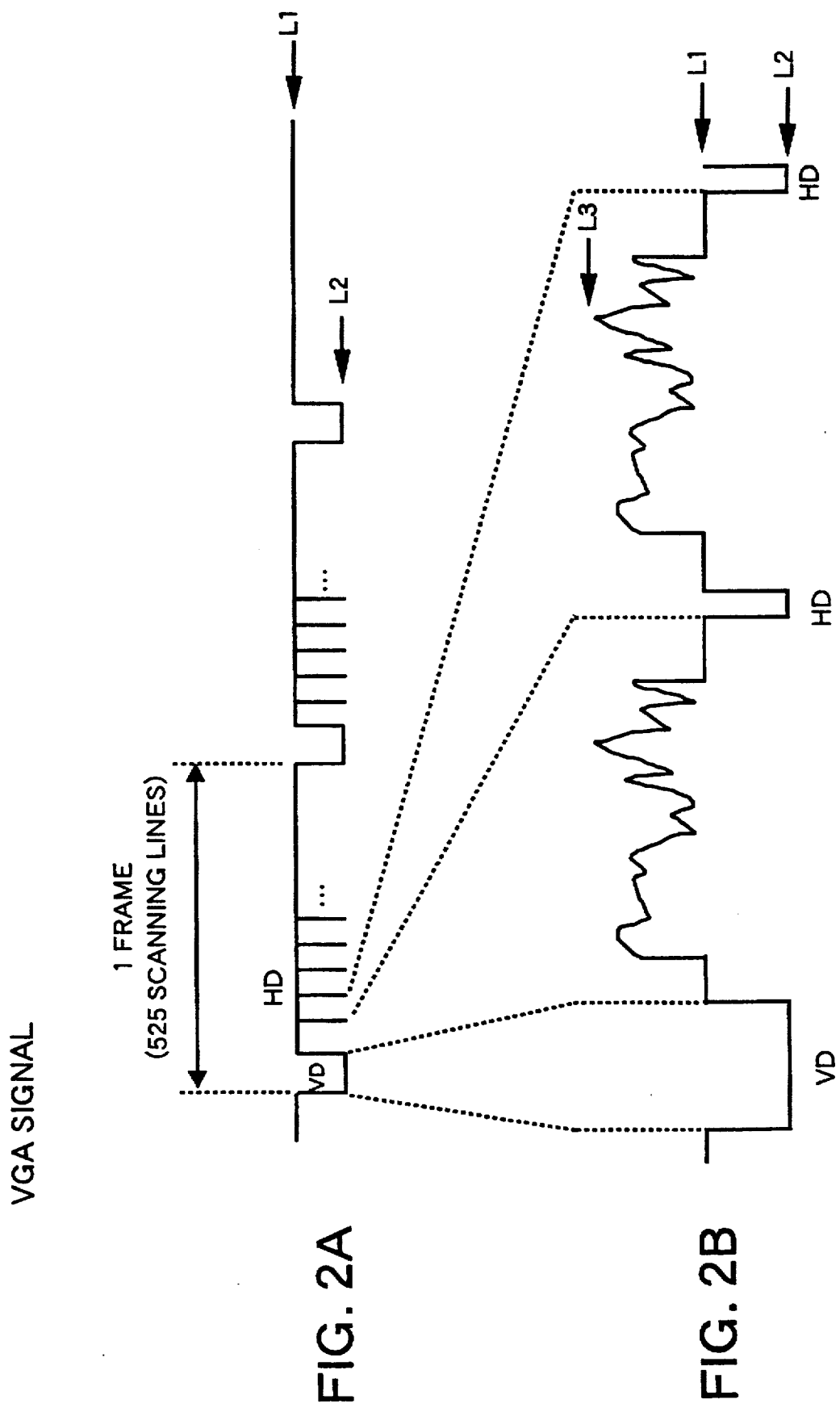
FIGS. 2A and 2B show the waveforms of an RGB signal used in the VGA system.

FIGS. 2A and 2B detailed waveforms of the RGB signals of the VGA system which are input to the RGB input terminals 101–103. Since the R signal, G signal, and the B signal are similar, the term "an RGB signal" is used as a general name for these three signals. In FIG. 2A, an RGB signal has 525 horizontal scanning lines in one frame for the NTSC system, and has 625 scanning lines for the PAL system. Since there is not much difference in converting the input signals of either the NTSC system or the PAL system, the NTSC system is generally used in explaining the present invention. FIG. 2A shows an enlarged sequence of the RGB signal, and FIG. 2B shows further enlarged sequence of the RGB signal of a portion of FIG. 2A. In the RGB signal, a vertical synchronization signal VD arrives first, and then a plurality of video signals arrive between respective horizontal synchronization signals HD. In this RGB signal, the number of horizontal lines between the vertical synchronous signals is 480, and the number of horizontal lines corresponding to the period of vertical synchronization signal VD is 45; thus, the total number of horizontal lines is 525. L1 and L2 in FIGS. 2A and 2B represent a pedestal level and a sync level, respectively. The pedestal level L1 indicates black level of the video data. As shown in FIG. 2B, the video data are located above this pedestal level L1, and the highest level in the video data is L3, which represents a white level included in the video data. The sync level L2 indicates the lowest level of the vertical synchronization signal VD and the horizontal synchronization signal HD.

FIG. 3A shows a detailed odd signal sequence of the intensity signal Y and the chrominance signals (B-Y) and (R-Y) of the NTSC system, and FIG. 3B shows a detailed even signal sequence of the intensity signal Y and the chrominance signals (B-Y) and (R-Y) of the NTSC system. From FIGS. 3A and 3B, it is easily understood that the odd-numbered scanning lines are displayed on the first field, and the even-numbered scanning lines are displayed on the second field.

FIG. 4A shows the timing of video signals. In FIG. 4A, "A" represents a front porch, "B" represents synchronization width, "C" represents a back porch, "D" represents a blanking period, "E" represents a display period, and "F" represents one synchronous period. FIG. 4B shows values of signal portions A–F for the VGA signal. FIG. 4C shows values of signal portions A–F for the NTSC signal. FIG. 4B and FIG. 4C are different in that the synchronous period F of FIG. 4B is 31.778 μs (31.47 MHz), while that of FIG. 4C is 63.5 μs (15.734 MHz). That is to say, since the NTSC system uses an interlace system, the synchronous period of the NTSC system are twice as that of the VGA system. The number of the horizontal scanning lines is 480 for the VGA signal, and 485 for the NTSC signal. As seen from this comparison, when converting a VGA signal to an NTSC signal, it is enough to generate only one scanning line of the NTSC signal from two scanning lines of VGA signal. Moreover, since the NTSC system uses the interlace system, the scanning lines of the VGA system are assigned alternately to the odd-numbered scanning lines and to the even-numbered scanning lines.

Figure 5:
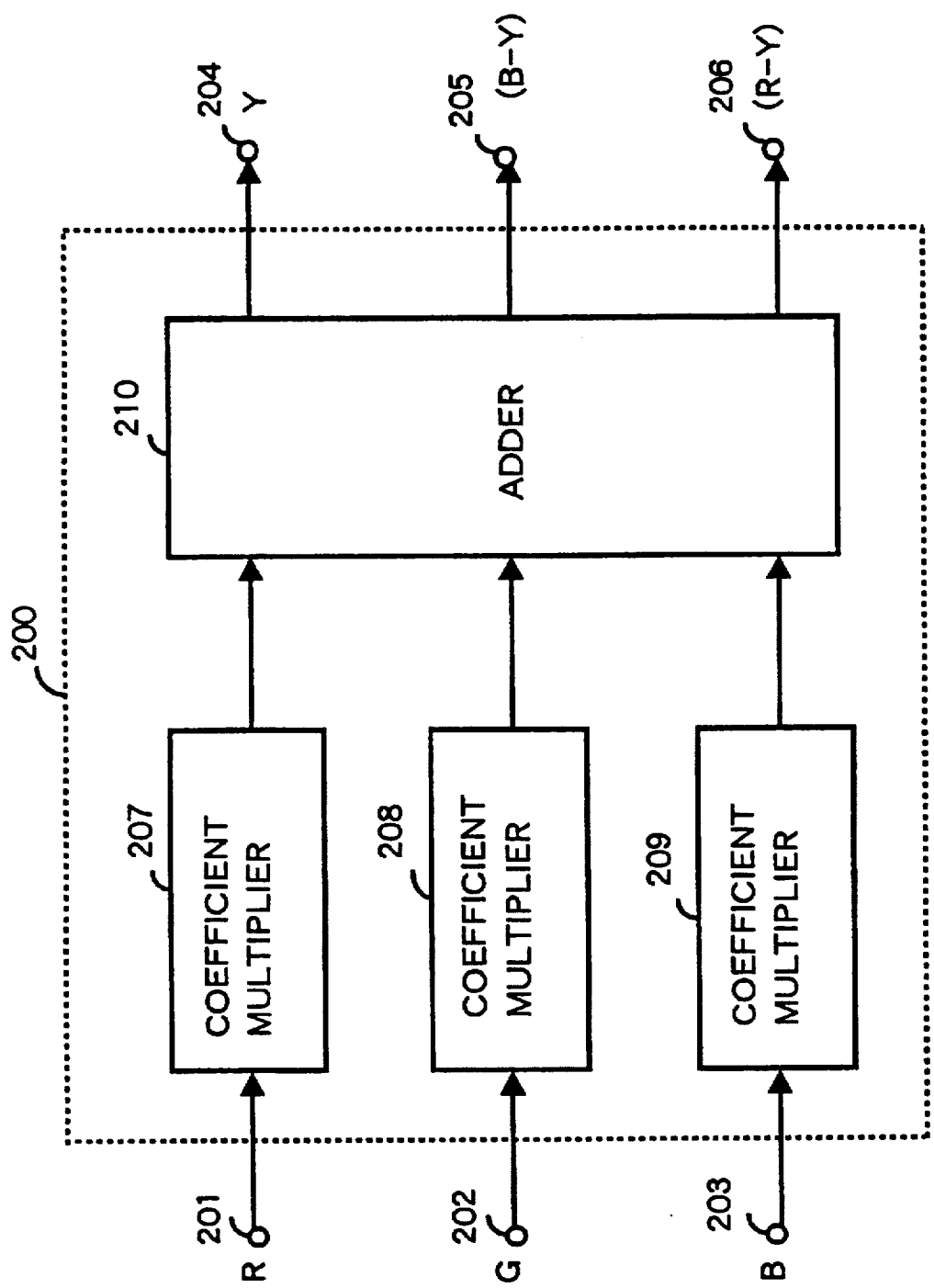
FIG. 5 shows a matrix converter.

FIG. 5 shows a matrix converter 200. After RGB signals are converted from digital data to analog form, the converted RGB signals are input to the input terminals 201, 202, and 203 as shown in FIG. 5. Coefficient Multipliers 207, 208, and 209 receive the respective RGB signals, and multiply them by the coefficients A11–A33 as shown in formulas (1)–(3). An adder 210 adds the respective multiplied results to obtain the intensity signal Y and the chrominance signals (B-Y) and (R-Y) of the NTSC system, and outputs them from the output terminals 204, 205, and 206.

FIG. 6 shows general formulas (1), (2), and (3) for generating the intensity signal Y and the chrominance signals (B-Y) and (R-Y) of the NTSC systems from the RGB signals using the coefficients A11–A33. The intensity signal Y of the NTSC system is generated according to the formula (1), the chrominance signal (B-Y) is generated according to the formula (2), and the chrominance signal (R-Y) is generated according to the formula (3). For example, the coefficient A11 is calculated by shifting the R signal by 2 bits (¼), by 5 bits (1/32), and by 6 bits (1/64), and by adding all of the three shifted signals, as illustrated in the first line in the table in FIG. 6. Other coefficients are calculated in a similar manner as illustrated in the table in FIG. 6. I signal and Q signal are generated in a similar manner, but the method for generating I signal and Q signal is well known in this art. Therefore, detailed explanation is omitted.

Figure 7:
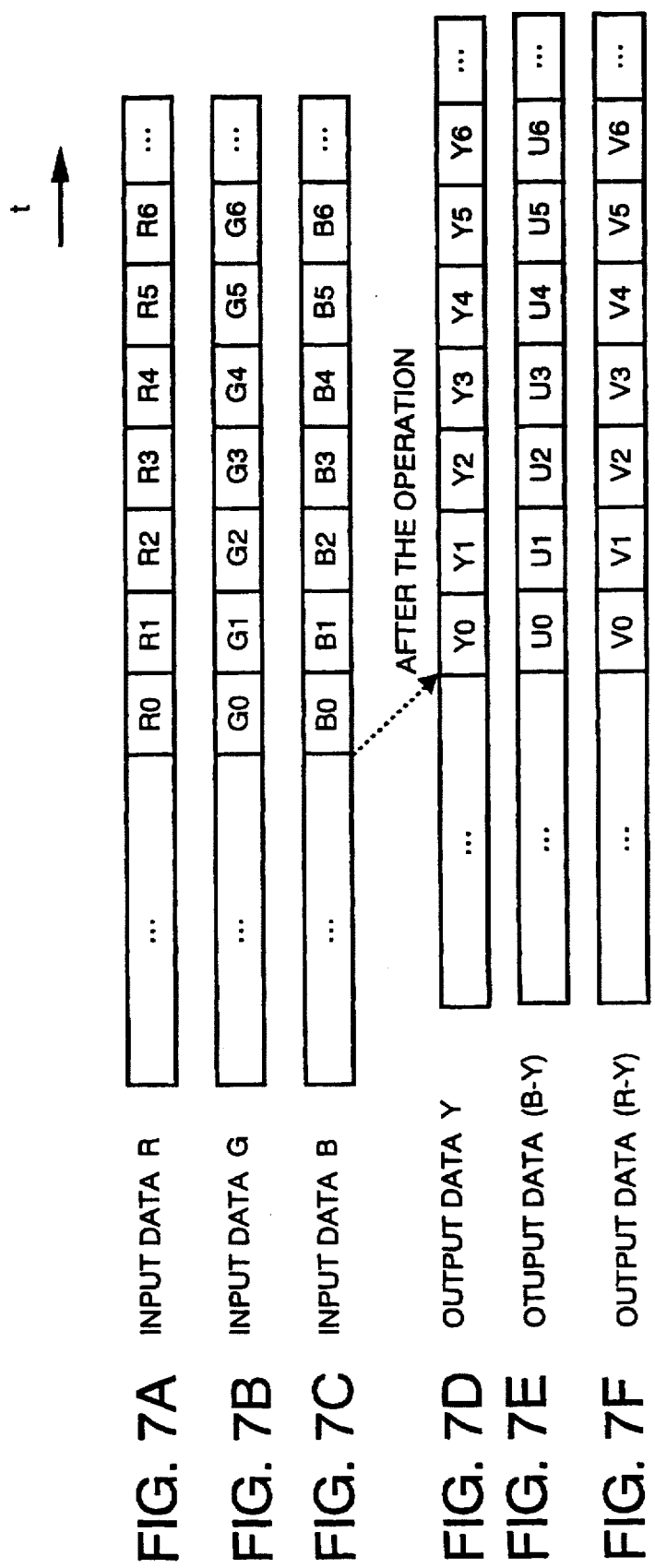
FIGS. 7A–7F show time relationships between the input RGB signals, and the output intensity signal Y and the chrominance signals (B-Y) and (R-Y) of the NTSC system.

FIGS. 7A–7F show time relationships between the input RGB signals, and the output intensity signal Y and the chrominance signals (B-Y) and (R-Y) of the NTSC system, which are generated by the matrix converter 200. As shown in FIGS. 7A–7C, the respective signals R0, R1, R2, . . . , G0, G1, G2, . . . , and B0, B1, B2, . . . , of the RGB signals are input to the matrix converter 200 in parallel. Although the intensity signal Y and the chrominance signals (B-Y) and (R-Y) of the NTSC system lag behind from the RGB signal by a predetermined time, the intensity signal Y and the chrominance signals (B-Y) and (R-Y) of the NTSC system are also output in parallel, in the manner that Y0, Y1, Y2, . . . , U0, U1, U2, . . . , and V0, V1, V2, . . . , as shown in FIGS. 7D–7F.

Figure 8:
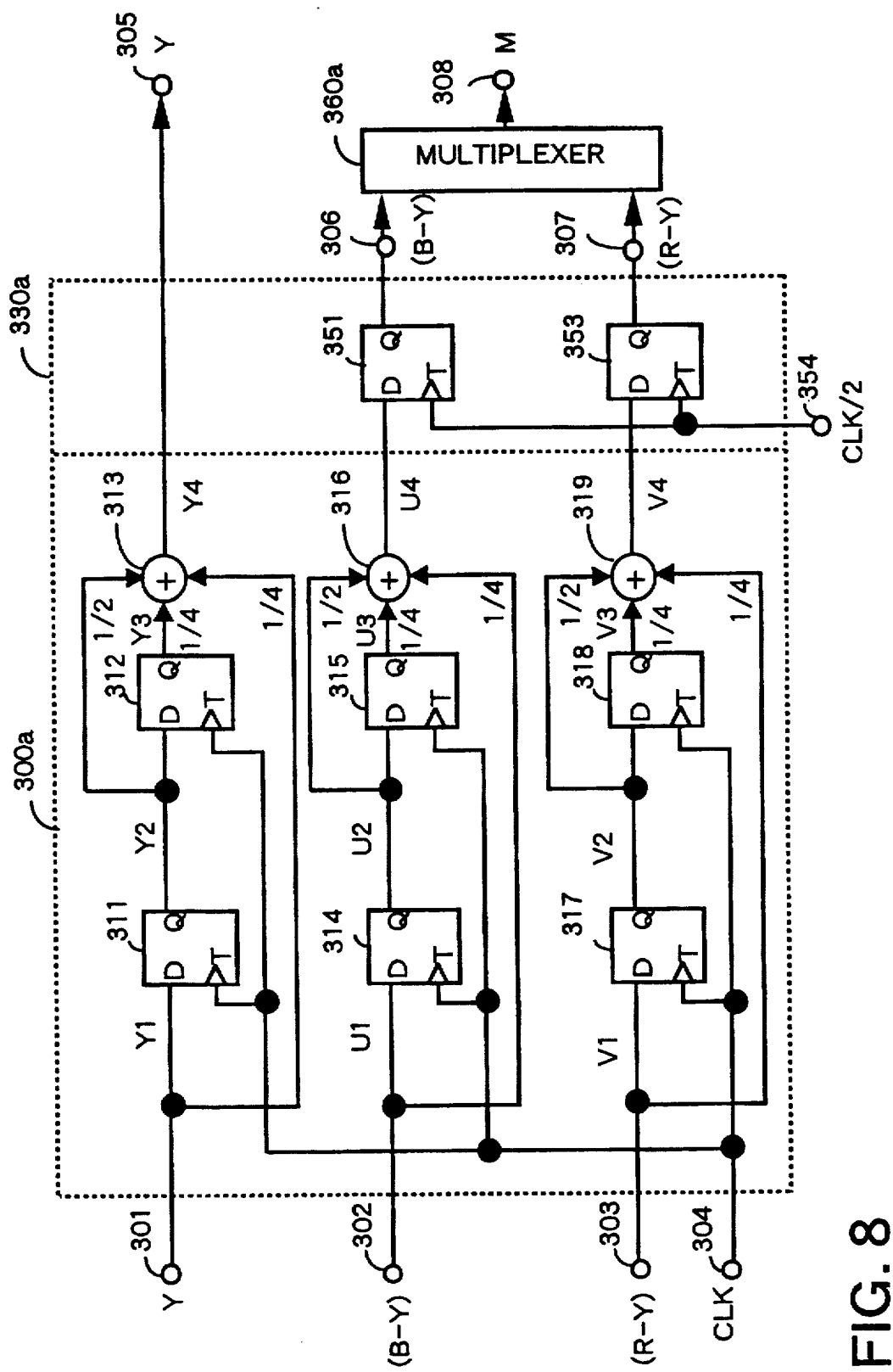
FIG. 8 shows a horizontal averaging circuit and a horizontal thinning circuit according to the first embodiment of the present invention.

FIG. 8 shows a horizontal averaging circuit 300a and the horizontal thinning circuit 330a according to the first embodiment of the present invention. The intensity signal Y of the NTSC system received from the matrix converter 200 at the terminal 301 is input to a D flip-flop 311, delayed by one clock cycle, and is output as a delayed signal Y2. This delayed signal Y2 is input to a D flip-flop 312, delayed by one clock cycle and output as delayed signal Y3. The input signal Y1, and the delayed signals Y2 and Y3 are applied to an adder 313, and the adder 313 averages these signals Y1, Y2, and Y3 and outputs as a delayed intensity signal Y4. In a similar manner, the input chrominance signal (B-Y) of the NTSC system received from the matrix converter 200 at the terminal 302 is input to a D flip-flop 314 as signal U1, delayed by one clock cycle, and is output as a delayed signal U2. This delayed signal U2 is input to a D flip-flop 315, delayed by one clock cycle and output as delayed signal U3. The input signal U1, and the delayed signals U2 and U3 are applied to an adder 316, and the adder 316 averages of these signals U1, U2, and U3 and outputs the result as a delayed chrominance signal U4. The input chrominance signal (R-Y) of the NTSC system received from the matrix converter 200 at the terminal 303 is input to a D flip-flop 317 as signal V1, delayed by one clock cycle, and the result is output as a delayed signal V2. This delayed signal V2 is input to a D flip-flop 318, delayed by one clock cycle, and output as delayed signal V3. The input signal V1, and the delayed signals V2 and V3 are applied to an adder 319, and the adder 319 averages these signals V1, V2, and V3 and outputs the result as a delayed chrominance signal V4.

The delayed chrominance signals U4 and V4 from the adders 316 and 319 are input to D flip-flops 351 and 353 in the horizontal thinning circuit 330a. In the respective D flip-flop circuits 351 and 353, the delayed chrominance signals U4 and V4 are latched at ½ the clock frequency (CLK/2), and output from the terminals 306, 307 as chrominance signals (B-Y) and (R-Y), respectively. These chrominance signals (B-Y) and (R-Y) are input to a multiplexer 360a, multiplexed, and output to the vertical filter circuit 400a as multiplexed chrominance signal M.

FIG. 9A shows a horizontal conversion ratio setting circuit 320. The circuit of FIG. 9A includes a writing clock generation circuit 321, a ½ frequency divider 323, and a ¼ frequency divider 324. The clock signal generated by the clock generation circuit 321 is sent to the frequency dividers 323 and 324 and divided by ½ and ¼, respectively, and output. The clock signal is directly output to an output terminal 325, and the divided clock signals are output to terminals 326, and 327, respectively. FIGS. 9B–9D show a clock waveform CL which is generated by the clock generation circuit 321, a clock waveform ½ CL divided by the frequency dividers 323, and a clock waveform ¼ CL divided by the frequency dividers 324, respectively.

The intensity signal Y and the multiplexed chrominance signal M of the NTSC system are output from the vertical filter circuit 400a to the field memory 500, and stored in the 1 H line memory, respectively. Writing of the intensity signal Y and the multiplexed chrominance signal M of the NTSC system is performed by the write controlling circuit 550, and reading is performed by the read controlling circuit 560.

The intensity signal Y and the multiplexed chrominance signal M are read from the field memory 600 to the demultiplexer 600 and demultiplexed, and the intensity signal Y and the chrominance signals (B-Y) and (R-Y) are obtained. These demultiplexed signals, the intensity signal Y, and the chrominance signals (B-Y) and (R-Y), are converted in the digital-to-analog converting circuit 700, provided to a television set, and are displayed.

FIGS. 10A–10I show the signal flow in the horizontal averaging circuit 300a, the horizontal thinning circuit 330a, and the multiplexer 360a, illustrated in FIG. 1 and FIG. 8. In the horizontal averaging circuit 300a, since the intensity signal Y is delayed in the same manner as the chrominance signals (B-Y) and (R-Y), the process for delaying the signal U only is explained and the explanation of the processes for the signals (B-Y) and (R-Y) are omitted. FIG. 10A shows a clock CLK input to the terminal 304 in the horizontal averaging circuit 300a. FIG. 10B shows a chrominance signal U1 input via the terminal 302 to the D flip-flop 314. D0, D1, D2, D3, . . . , show data streams of the chrominance signal U1. FIG. 10C shows the data stream U2, which is delayed in the D flip-flop 314 by one clock cycle. FIG. 10D shows a data stream U3, which is delayed further in the D flip-flop 315 by another clock cycle. FIG. 10E shows a data stream U4, which is the signal obtained by weighting and adding the signals U1, U2, and U3. The weighting of these signals is determined, for example, dividing the data of the middle line out of three lines by two, and dividing the other two lines out of three lines by four. The weighting of these signals are expressed in the formula such as B0=D0/4+D1/2+D2/4, where, B0 represents data obtained by weighting and adding the respective data D0, D1, and D2. B1, B2, B3, . . . , are calculated in the same manner.

FIG. 10F shows the clock CLK/2 input to the terminal 354 in the horizontal thinning circuit 330a. The clock CLK/2 of FIG. 10F has half of the frequency of the clock input to terminal 304 of the horizontal averaging circuit 300a. The chrominance signal U4, obtained from the adder 316, is input to the D flip-flop 351 in the horizontal thinning circuit 330a, and the data UC0 illustrated in FIG. 10G is obtained at the terminal 305. The data UC0 equals the data B0, however, it is latched in two clock cycles at the D flip-flop 351, since the frequency of the clock input to the D flip-flop 351 is divided by two. For the chrominance signal V input to the terminal 303, it is latched in two clock cycles at the D flip-flop 353, and data VC0 is obtained in the same manner from the D flip-flop 353 as illustrated in FIG. 10H. In the next stage, the output from the D flip-flop 351 and the output from the D flip-flop 353 are multiplexed in the multiplexer 360a, and the multiplexed chrominance signal M is obtained in the order of data UC0, VC0, UC1, VC2, UC3, VC3, . . . , as illustrated in FIG. 10I.

The intensity signal Y from the horizontal averaging circuit 300a and the multiplexed chrominance signal M from the multiplexer 360a are input to the vertical filter circuit 400a. As illustrated in FIG. 1, the intensity signal Y1, which is the same as the input signal, is added to the intensity signal Y2 delayed by one clock cycle in the delay memory 401 and in the adder 402, and their average is obtained from the adder 402 as intensity signal Y. The multiplexed chrominance signal M, which is the same as the input signal, is added to the chrominance signal M2, delayed in the delay memory 403, in the adder 404 of the vertical filter 400a, and their average is obtained as a multiplexed chrominance signal M.

Figure 11:
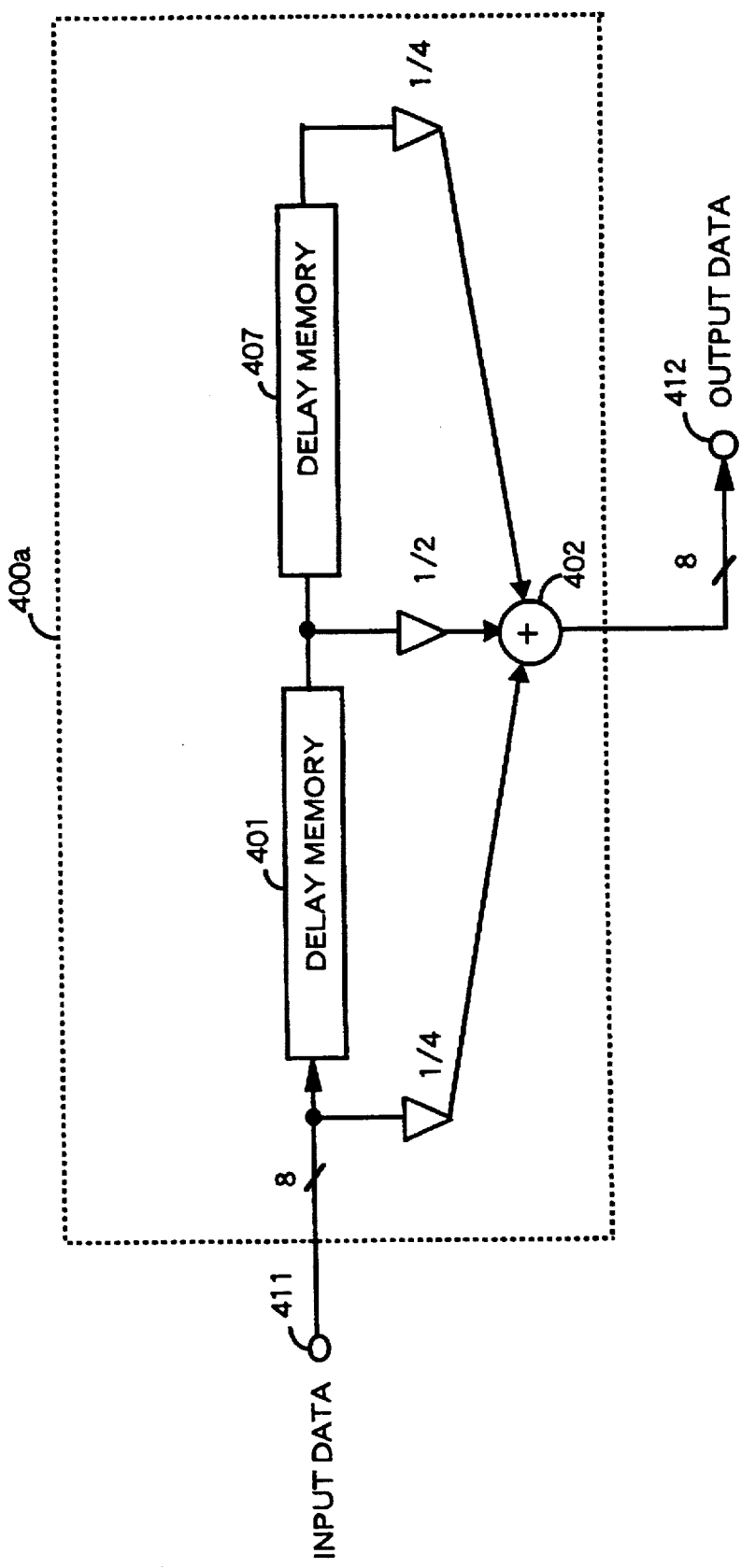
FIG. 11 shows a vertical filter circuit with two delay memories.

FIG. 11 illustrates another type of vertical filter 400a with two delay memories. The vertical filter 400a of FIG. 1 only has one delay memory, however, it is also possible to use two delay memories as illustrated in FIG. 11. In other words, averaging is performed by using data for three lines to obtain data for one line. By performing this averaging process, that is, by adding the data of the current line, data of the preceding line, and the data of the line ahead the preceding line, data corresponding to one line are obtained. By averaging the vertically adjacent display data of the plural lines, the difference between the intensities of the vertically adjacent display data are maintained relatively small, to a level that the human eyes cannot recognize the flickering. The vertical filter circuit 400a of FIG. 11 includes an input terminal 411, delay memories 401 and 407, an adder 402, and an output terminal 412. The vertical filter circuit 400a of FIG. 11 is the same as the circuit for delaying the intensity signal in the conventional vertical filter circuit 400; therefore, a detailed explanation is omitted.

In FIG. 1, the field memory 500 stores the intensity signal Y and the multiplexed chrominance signal M of the NTSC system output from the vertical filter circuit 400a for every line. The write controlling circuit 550 controls writing of the intensity signal Y and the multiplexed chrominance signal M of the NTSC system to the field memory 500. The read controlling circuit 550 controls reading the intensity signal Y and the multiplexed chrominance signal M of the NTSC system from the field memory 500.

Figure 12:
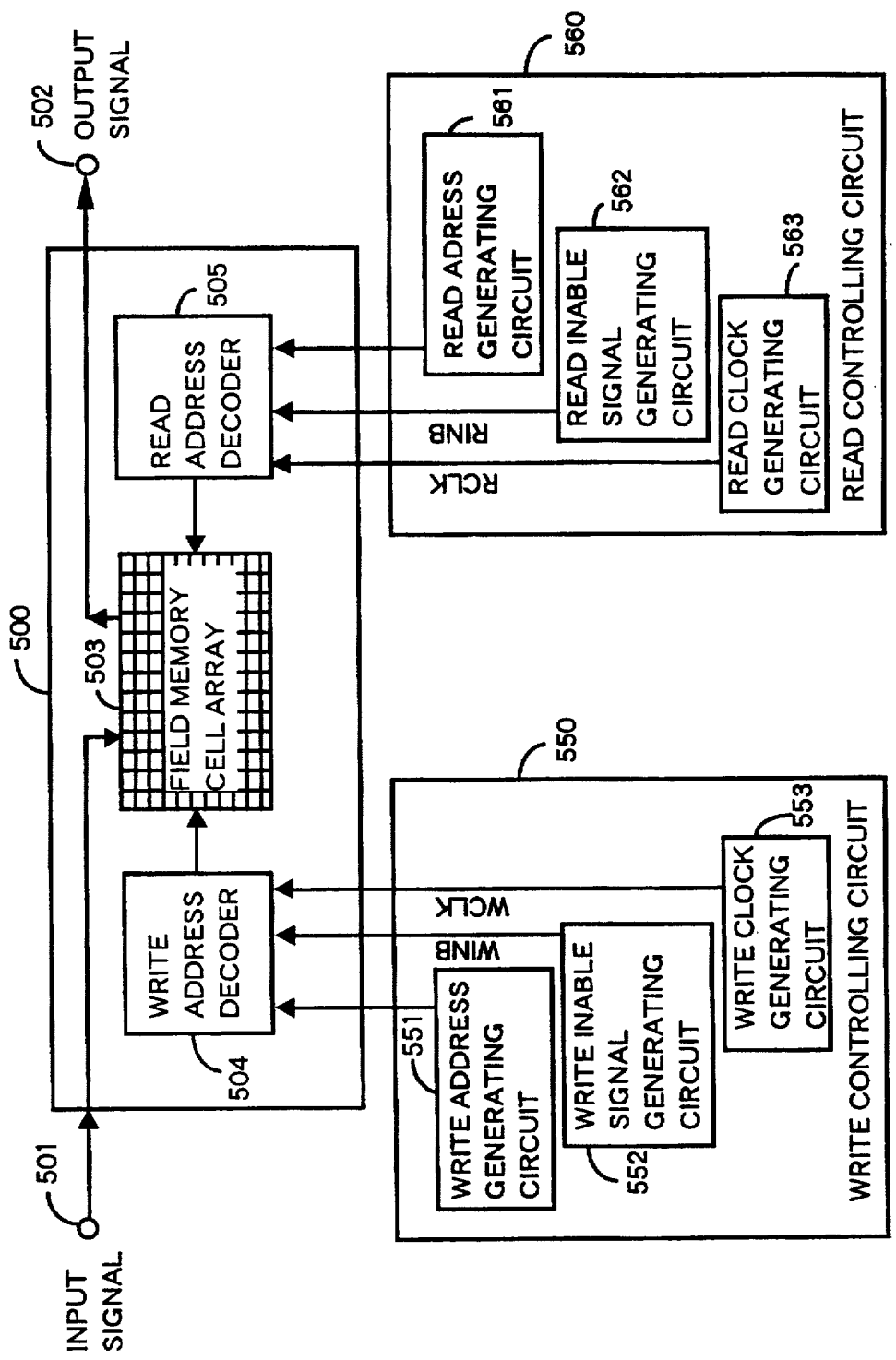
FIG. 12 is a circuit diagram explaining write control and read control of a field memory.

FIG. 12 explains the write control and the read control for the field memory 500. The circuit of FIG. 12 includes an input terminal 501 for receiving the intensity signal Y or the multiplexed chrominance signal M from the vertical filter circuit 400a. The field memory 500 operates in the same manner for the intensity signal Y or the multiplexed chrominance signal M; therefore, the operation of the intensity signal Y is explained below. The intensity signal Y is input to the terminal 501, and written into a field memory array 503 under the control of the write controlling circuit 650.

The process of the write control is explained below. The address signal generated by a write address generating circuit 551, the write clock (WCLK) generated in a write clock generating circuit 553, and the write enable signal (WINB) generated in a write enable signal generating circuit 552 are transmitted to the address decoder 504. When receiving the enable output signal (WINB), the address decoder 504 writes the intensity signal Y synchronously with the write clock (WCLK) into the field memory array corresponding to the address generated in the write address generating circuit.

The intensity signal Y written to the field memory array 503 is read under the control of the address decoder 505. Next, the process for reading out is explained. The address signal generated by a read address generating circuit 561, the read clock (RCLK) generated in the read clock generating circuit 563, and the read enable signal (RINB) generated in the read enable signal generating circuit 562 are transmitted to the read address decoder 505. When receiving the enable output signal, the read address decoder 505 reads out the intensity signal Y from the field memory array corresponding to the address signal generated in the read address generating circuit 561, synchronously with the read clock (RCLK). The read intensity signal Y is provided to the output terminal 502.

FIGS. 13A–13F are timing charts showing the relationship of a writing data and a reading data. Since one display of the NTSC signal corresponds to two VGA signals as explained above, the frequency of the write clock (WCLK) is twice that of the read clock (RCLK).

FIG. 13A shows writing data for one line of the intensity signal or the multiplexed chrominance signal M, which is written to the field memory array 503 during period T. As illustrated in FIG. 13B, the write controlling circuit 550 writes one line of data into the field memory array 503 using the write clock (WCLK) during period T, only when the enable signal (WINB) is logic "L".

FIG. 13D shows read data of the intensity signal or the multiplexed chrominance signal M which is read from the field memory array 503 during the period 2T. As illustrated in FIG. 13E, the read controlling circuit 560 reads one line data from the field memory array 503 in response to the read clock (RCLK) during period 2T, only when the read enable signal (RINB) is logic "L".

When the field memory array 503 is a FIFO (first-in, first-out) memory, since the written data can be read in response to the next or subsequent clock pulses immediately after the data is written as shown in FIG. 13A, it is possible to write the next data immediately after a 2T period, as illustrated in FIG. 13A, because after the time 2T, all data in the FIFO is already read out as illustrated in FIG. 13D.

Figure 17A:
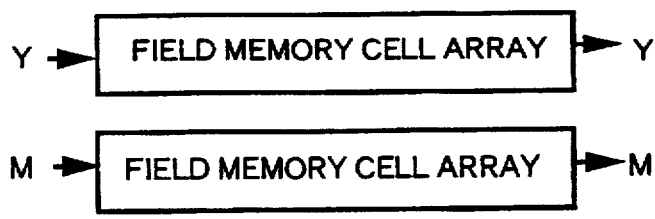
FIGS. 17A–17C show the necessary capacity of the field memory cell array used in the field memory.

FIG. 17A shows the necessary capacity of the field memory cell array 503 used in the field memory 500 according to the first embodiment of the present invention. In the first embodiment, two full one-line field memory cell arrays are required, one for storing the intensity signal Y, and the other for storing the multiplexed chrominance signal M. The field memory cell array for the multiplexed chrominance signal M stores both of the chrominance signals (B-Y) and (R-Y). Therefore, only one line field memory cell array is enough for the both chrominance signals (B-Y) and (R-Y).

Figure 14:
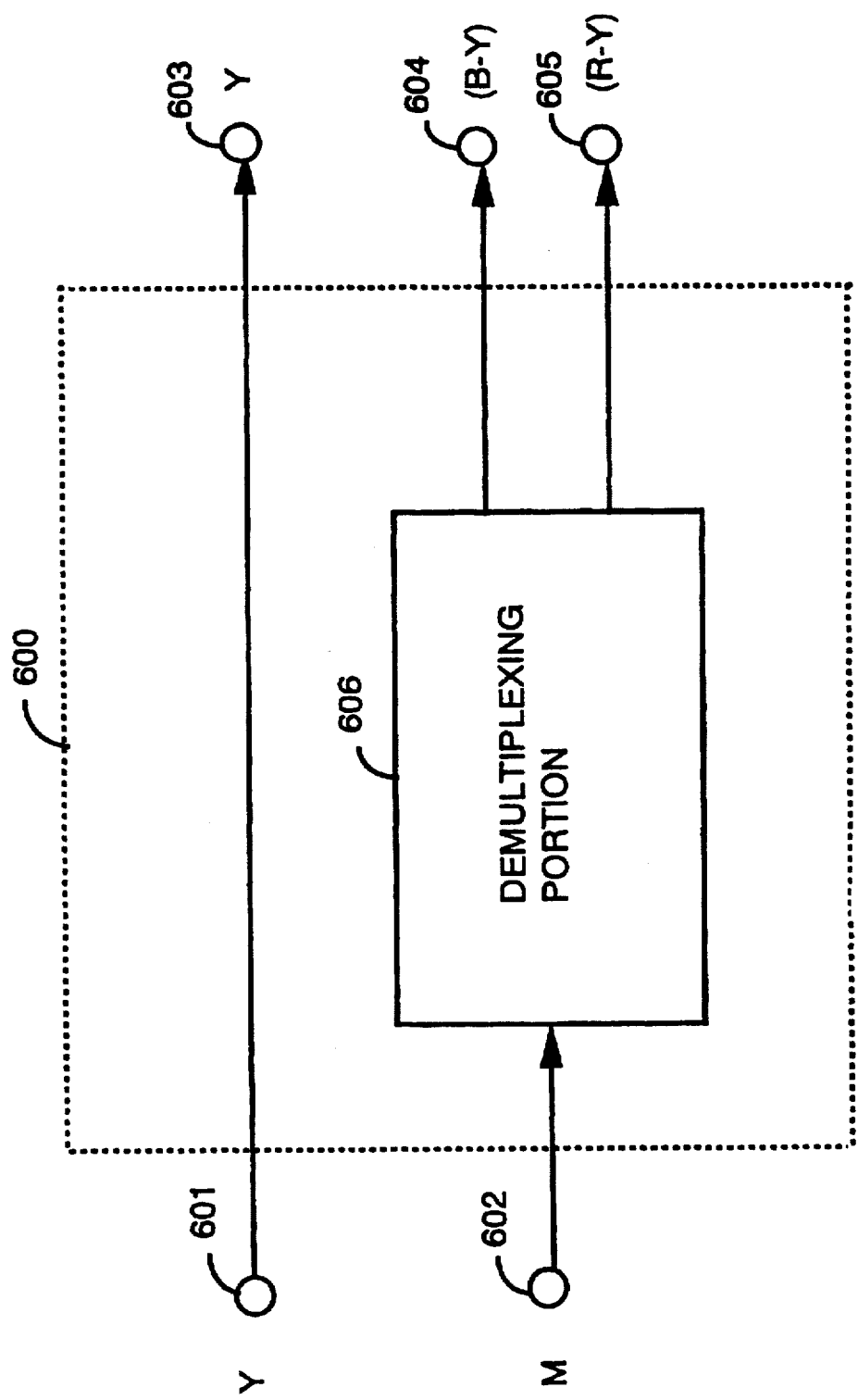
FIG. 14 shows a demultiplexer according to the first embodiment of the present invention.

FIG. 14 shows a demultiplexer 600. In the demultiplexer 600, the intensity signal Y input to the terminal 601 passes through the demultiplexer 600, and is output to the terminal 603. The chrominance signal M from the terminal 602 is demultiplexed by a demultiplexing portion 606 in the demultiplexer 600, and output to the terminals 604 and 605, as demultiplexed chrominance signals (B-Y) and (R-Y), respectively.

The digital-to-analog conversion circuit 700 receives the intensity signal Y and the chrominance signals (B-Y) and (R-Y) of the NTSC system from the demultiplexer 600, converts them from digital to analog form and outputs them as analog signals. These converted analog intensity signal Y and chrominance signals (B-Y) and (R-Y) are provided to the television set. In this manner, RGB signals of the VGA system are converted to the signals Y, (B-Y) and (R-Y) of the NTSC system and are displayed on a television screen.

In the first embodiment, since the scanning lines are averaged and thinned horizontally before the scanning lines are averaged vertically, it is possible to reduce the memory capacity of the 1 H line memory in the field memory. In this manner, the memory capacity for one line is reduced in comparison to the conventional circuit.

Embodiment 2

Figure 15:
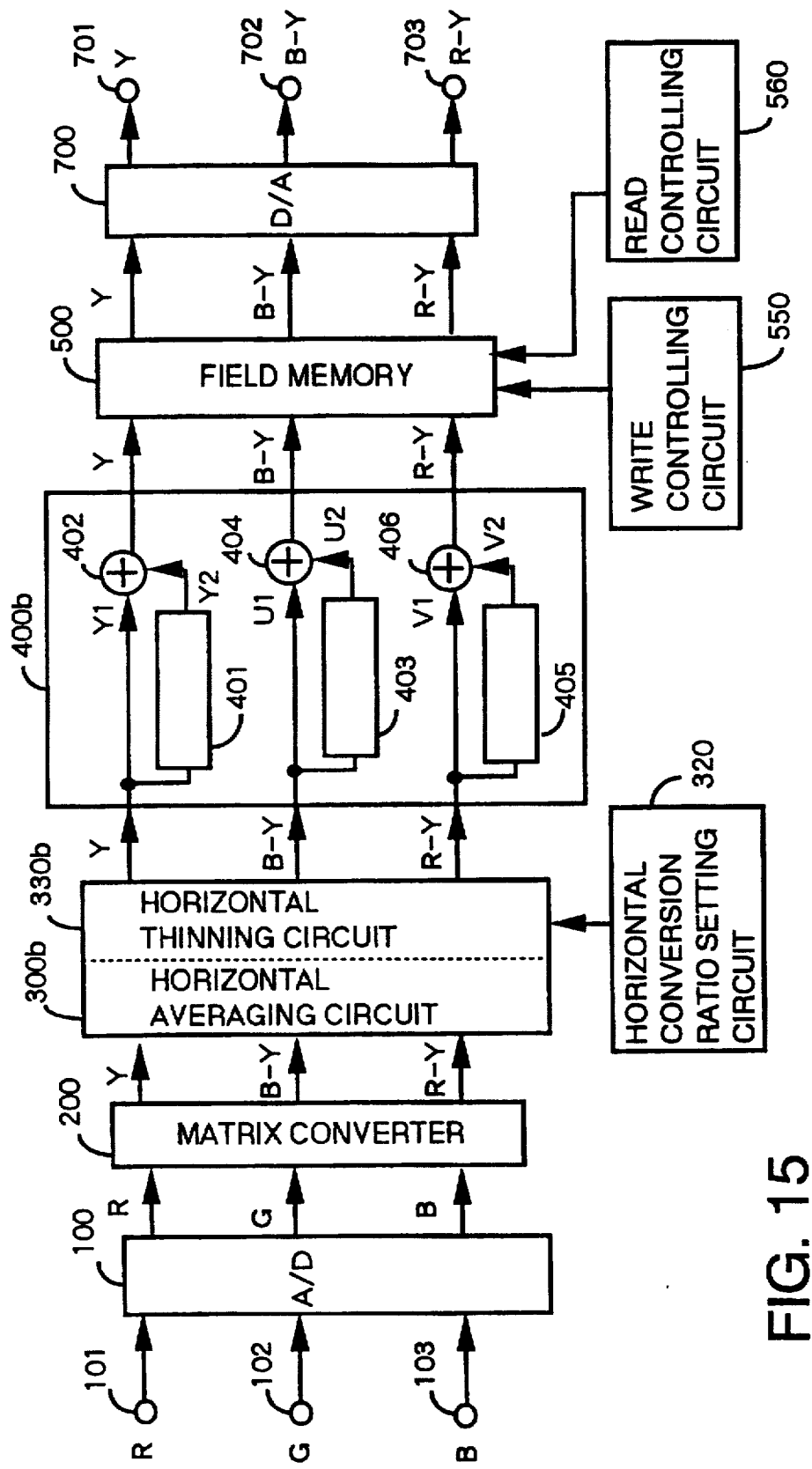
FIG. 15 shows a video system conversion circuit according to a second embodiment of the present invention.

FIG. 15 shows a video system conversion circuit according to a second embodiment of the present invention. In FIG. 15, an R signal (red signal), a G signal (green signal), and a B signal (blue signal) are input to an analog-to-digital converter 100, and converted from analog form to digital signals. The respective RGB signals, which are converted by the analog-to-digital converter 100, are input to a matrix converter 200. The matrix converter 200 converts the respective digital RGB signals into an intensity signal Y, and two chrominance signals (B-Y) and (R-Y) of the NTSC system (or the PAL system) which are used for television, and are output to a horizontal averaging circuit 300b.

Figure 16:
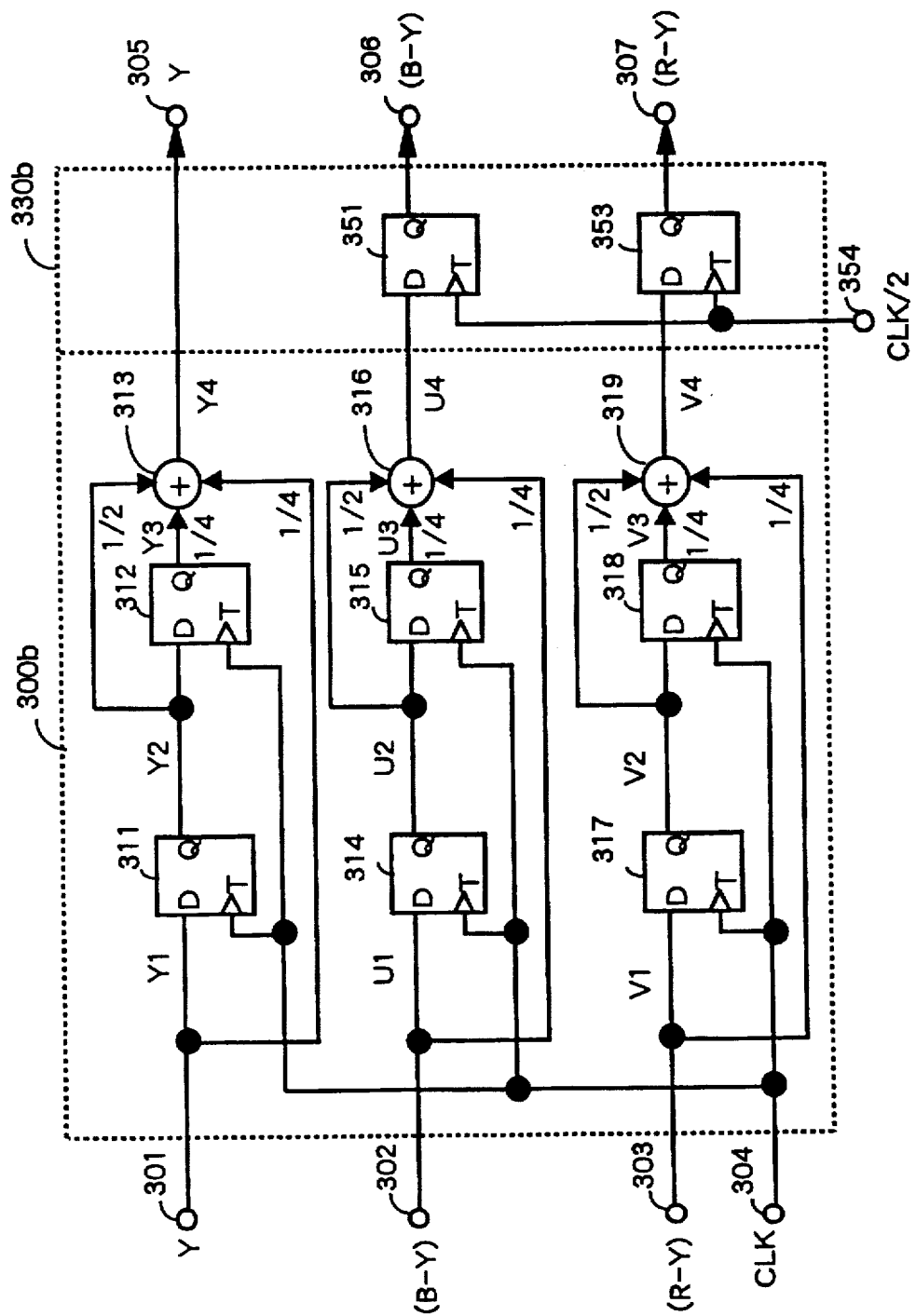
FIG. 16 shows a horizontal averaging circuit and a horizontal thinning circuit according to the second embodiment of the present invention.

FIG. 16 shows the horizontal averaging circuit 300b and a horizontal thinning circuit 330b according to the second embodiment. The second embodiment is different from the first in that the horizontal averaging circuit 300b does not include a multiplexer 360a. In the horizontal averaging circuit 300b of FIG. 16, the intensity signal Y1 of the NTSC system output from the matrix converter 200, is input to a D flip-flop 311 from the terminal 301, in the same manner as in the first embodiment. The D flip-flop 311 delays the intensity signal Y1 by one clock cycle, and outputs a delayed signal Y2. The delayed signal Y2 is input to a D flip-flop 312, delayed, and output as a delayed signal Y3. The input signal Y1, the delayed signal Y2, and the delayed signal Y3 are input to an adder 313. The adder 313 adds the three signals Y1, Y2 and Y3, and averages the signals Y1, Y2 and Y3. The calculated average signal is output as an intensity signal Y from the adder 313 to a terminal 305. In the same manner, the chrominance signals (B-Y) and (R-Y) are averaged, respectively, and the averaged chrominance signals (B-Y) and (R-Y) are output from the terminals 306 and 307, respectively.

The delayed signal Y4 from the adder 313 in the horizontal averaging circuit 300b is output to the terminal 305 as the intensity signal Y. The delayed signals U4 and V4 from the adder 316 and 319, are input to the D flip-flops 351 and 353 in the horizontal thinning circuit 330b, respectively. The respective D flip-flops 351 and 353 latch the chrominance signals (B-Y) and (R-Y) from the adders 316 and 319 during 2-clock periods according to ½ frequency clock (CLK/2). The latched signals are output from the terminals 306 and 307 as chrominance signals (B-Y) and (R-Y). At this time, thinning is performed on the respective chrominance signals (B-Y) and (R-Y). These thinned signals (B-Y) and (R-Y) are output to the vertical filter circuit 400b without being multiplexed.

The vertical filter circuit 400b averages the intensity signal Y received from the horizontal averaging circuit 300b and the chrominance signals (B-Y) and (R-Y) received from horizontal thinning circuit 330b, respectively, and outputs the averaged intensity signal Y and the chrominance signals (B-Y) and (R-Y) of the NTSC system.

A first averaging circuit including a delay memory 401 and an adder 402, a second averaging circuit including a delay memory 403 and an adder 404, and a third averaging circuit including a delay memory 405 and an adder 406 in the vertical filter 400b are the same as the averaging circuit including the delay memory 401 and the adder 402 illustrated in FIG. 1 of the first embodiment, therefore, that explanation is not repeated.

In the second embodiment, the intensity signals Y and the chrominance signals (B-Y) and (R-Y) of the NTSC system, which are output from the vertical filter circuit 400b, are stored in the field memory arrays located in the field memory 500 under the control of a write controlling circuit, and read from the corresponding field arrays 503 under the control of a read controlling circuit, and the intensity signal Y and the chrominance signals (B-Y) and (R-Y) of the NTSC systems are output. The construction and the operation of the field memory 500 in the second embodiment are the same as that in the first embodiment, therefore, its detailed explanation is omitted. Since the field memory 500 outputs the intensity signal Y and the chrominance signals (B-Y) and (R-Y) in the second embodiment, the demultiplexer 600 used in the first embodiment is not necessary in the second embodiment.

Figure 17B:
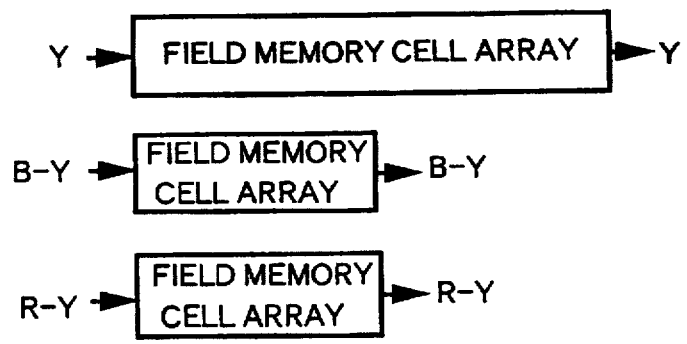
Figure 17C:
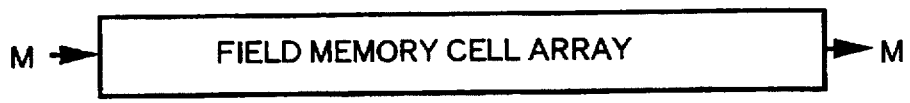

FIG. 17B illustrates the capacity required for the respective field memory cell arrays, used in the field memory 500 according to the second embodiment. In the second embodiment, three field memory cell arrays are required, one for the intensity signal Y, and the remaining two are for the respective chrominance signals (B-Y) and (R-Y). The field memory cell arrays for the two chrominance signals (B-Y) and (R-Y) are sufficient with a capacity of ½ line, respectively, because the horizontal lines are thinned in the horizontal thinning circuit 330.

The respective outputs of the intensity signal Y and the chrominance signals (B-Y) and (R-Y) of the NTSC system are transmitted to a digital-to-analog converter 700, digital-to-analog converted, and output to the television set as analog intensity signal Y and analog chrominance signals (B-Y) and (R-Y) of the NTSC system.

In the second embodiment, since a vertical and horizontal direction thinning process is performed on the first and the second chrominance signals, the capacity of the field memory 500 can be small. In the conventional circuit, memory capacity for storing three lines has been required, but, in the second embodiment of the present invention, if assuming that the thinning reduces the scanning lines to a half, only half of the field memory is required for the respective chrominance signals (B-Y) and (R-Y), as illustrated in FIG. 17B. Therefore, as a whole, a field memory having the capacity of two lines may be enough. In this manner, the required capacity of the field memory can be reduced.

Embodiment 3

Figure 18:
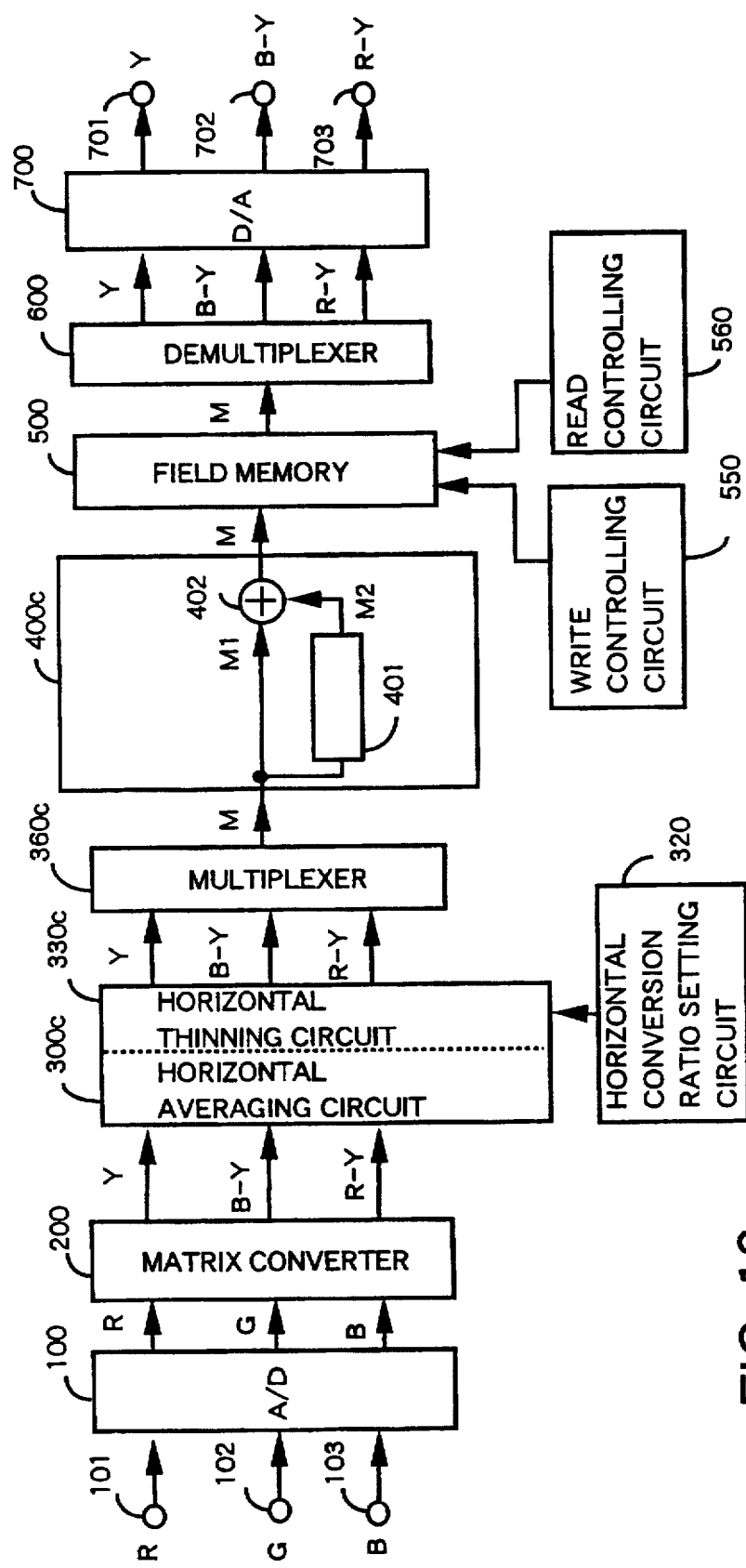
FIG. 18 shows a video system conversion circuit according to a third embodiment of the present invention.

FIG. 18 shows a video system conversion circuit according to a third embodiment of the present invention. In FIG. 18, an R signal (red signal), a G signal (green signal), and a B signal (blue signal) are input to an analog-to-digital converter 100, and converted from analog into digital form. The respective RGB signals, which are converted by the analog-to-digital converter 100, are input to a matrix converter 200. The matrix converter 200 converts the respective digital output RGB signals into an intensity signal Y, and two chrominance signals (B-Y) and (R-Y) of the NTSC system (or the PAL system) which are used for television, and are output to a horizontal averaging circuit 300c.

Figure 19:
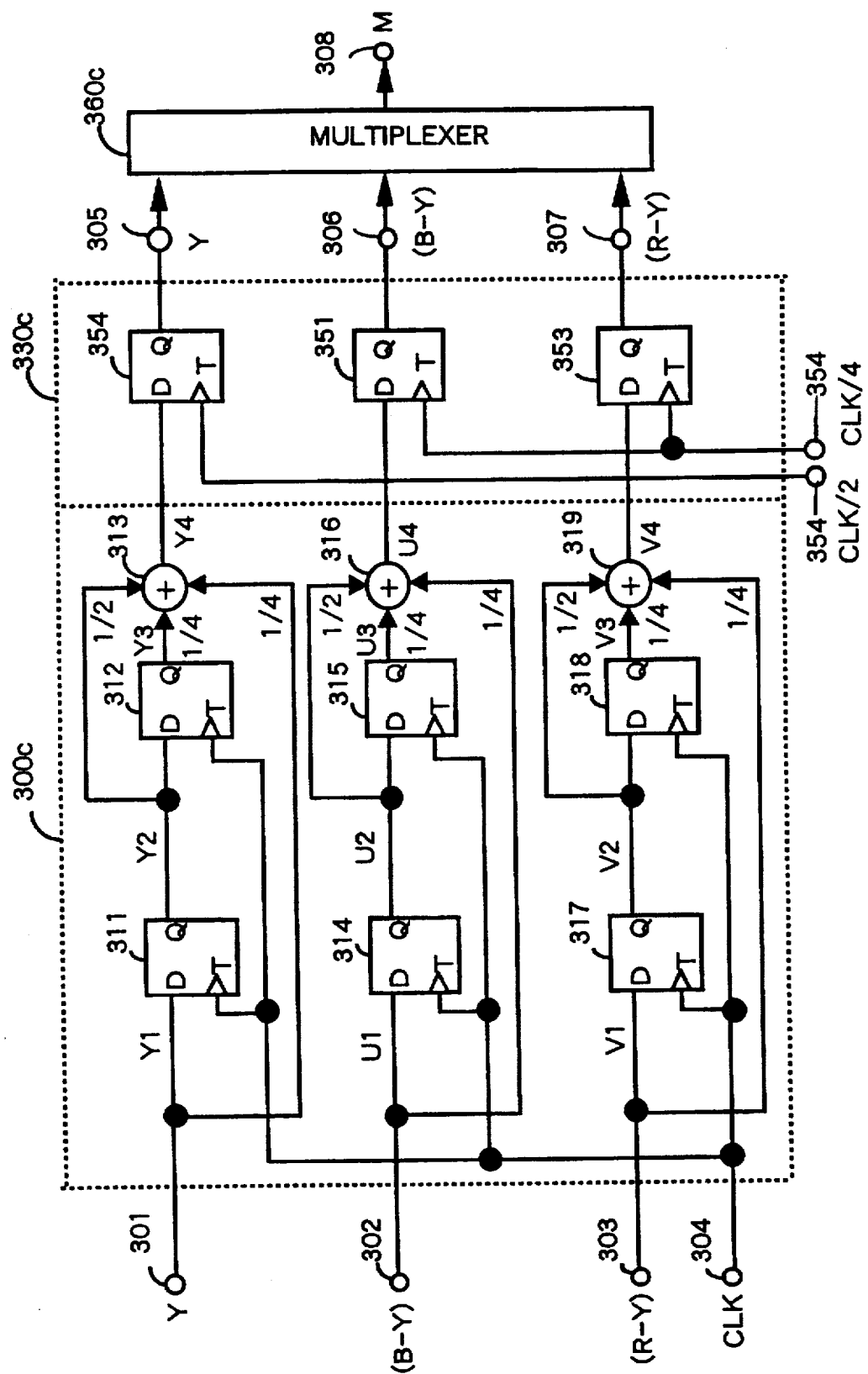
FIG. 19 shows a horizontal averaging circuit and a horizontal thinning circuit according to the third embodiment of the present invention.

FIG. 19 shows the horizontal averaging circuit 300c, a horizontal thinning circuit 330c and a multiplexer 360c according to a third embodiment. In the horizontal averaging circuit 300c of FIG. 18, the intensity signal Y1 of the NTSC system output from the matrix converter 200, is input to a D flip-flop 311 from the terminal 301, in the same manner as in the first embodiment. The D flip-flop 311 delays the intensity signal Y1 by one clock cycle, and outputs a delayed signal Y2. The delayed signal Y2 is input to a D flip-flop 312, delayed, and output as a delayed signal Y3. These input signal Y1, delayed signal Y2, and the delayed signal Y3 are input to an adder 313. The adder 313 adds the three signals Y1, Y2 and Y3, and averages the signals Y1, Y2 and Y3. The calculated average is output as an intensity signal Y4 from the adder 313. In the same manner, the chrominance signals (B-Y) and (R-Y) are averaged, respectively, and the averaged chrominance signals (B-Y) and (R-Y) are output from the terminals 306, 307, respectively.

The delayed signals Y4, U4, and V4 output from the adders 313, 316, and 319 in the horizontal averaging circuit 300c are input to the D flip-flops 354, 351, and 353 located in the horizontal thinning circuit 330c, respectively. The intensity signal Y4 and the chrominance signals U4 and V4 from the adder 313, 316, and 319 are latched during two clock cycles according to ½ frequency clock (CLK/2), and are output from the terminals 305, 306 and 307 as the intensity signal Y and the chrominance signals (B-Y) and (R-Y). At this time, the thinning operation is performed on the respective intensity signal Y and the chrominance signals (B-Y) and (R-Y) in the horizontal thinning circuit 330c. The thinned intensity signal Y and the chrominance signals (B-Y) and (R-Y) are transmitted to the multiplexer 360c, multiplexed, and output to the vertical filter circuit 400c as a multiplexed signal M.

Since all of the intensity signal Y and the chrominance signal (B-Y) and (R-Y) are multiplexed into a multiplexed signal M, only one vertical averaging circuit is necessary in the vertical filter circuit 400c for processing the entire multiplexed signal M. In FIG. 18, the multiplexed signal M from the multiplexer 360c is input to the vertical filter circuit 400c as a multiplexed signal M1. The multiplexed signal M1 is added with a signal M2, which has been delayed by one clock cycle in the 1 H memory 401, at the adder 402 to perform the vertical averaging, and the vertically-averaged multiplexed signal M is output from the vertical filter circuit 400c.

Figure 20:
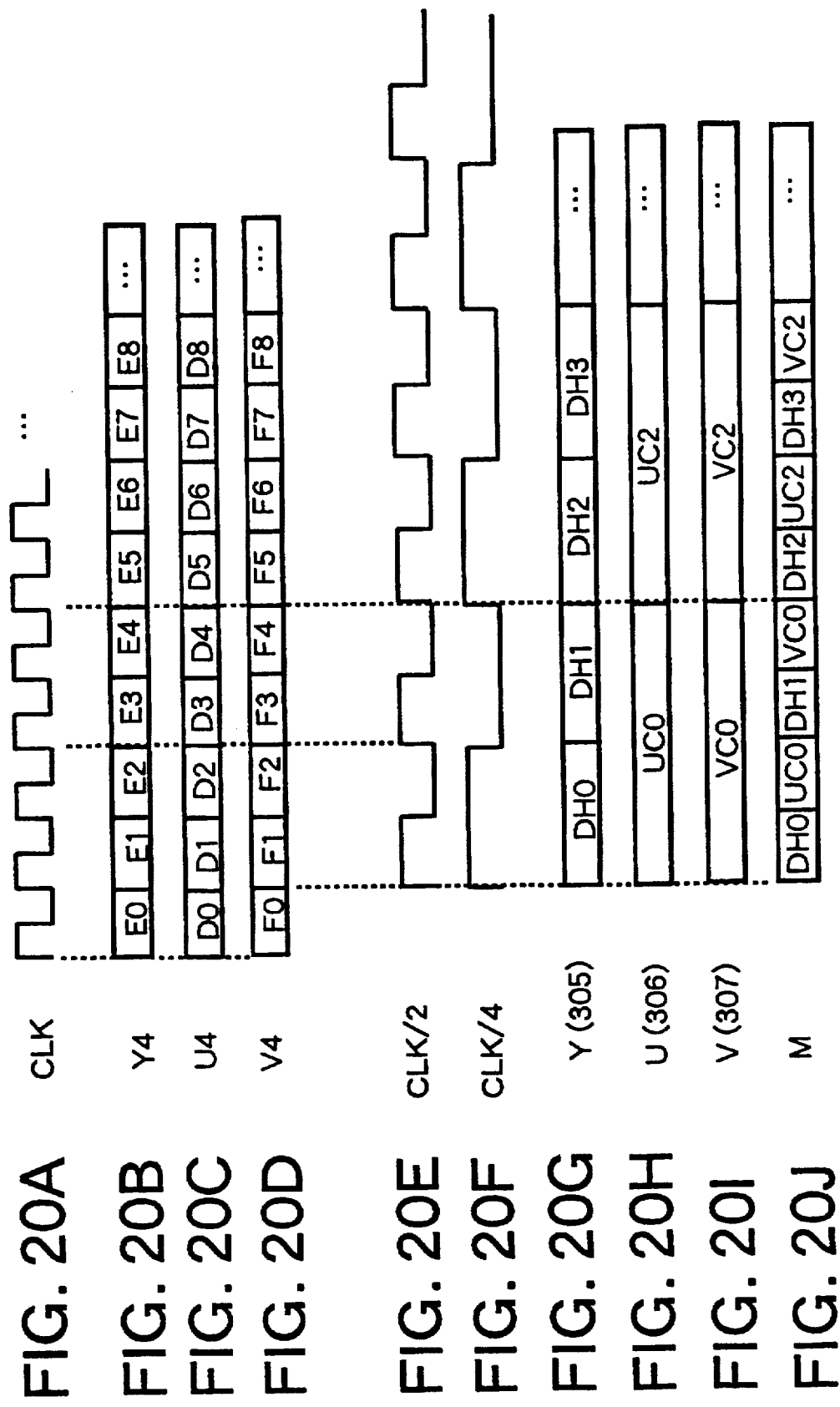
FIGS. 20A–20J are timing charts of a thinning process according to the third embodiment of the present invention.

FIGS. 20A–20J show timing charts of the thinning process. FIGS. 20B, 20C, and 20D illustrate the respective averaged signals Y4, U4, and V4 output from the respective adders 313, 316, and 319. It is assumed here that the data of averaged signal Y4 output from the adder 313 are in the order of E0, E1, E2, E3, . . . , the data of averaged signal U4 output from the adder 316 are in the order of D0, D1, D2, D3, . . . , and that the data of the averaged signal V4 output from the adder 319 are in the order of F0, F1, F2, F3, . . . . The clock CLK/2 illustrated in FIG. 20E is applied to the D flip-flop 354. The clock CLK/4 illustrated in FIG. 20F is applied to the respective D flip-flops 351 and 353. Therefore, the frequencies of the data E0, E1, E2, E3, . . . , of the intensity signal Y4 output from the adder 313 are reduced to a half, and the data with the reduced frequencies are output from the output terminal 305 in the order of DH0, DH1, DH2, DH3, . . . . The frequencies of the data D0, D1, D2, D3 . . . , of the chrominance signal U4 output from the adder 316 are reduced to one fourth, and the data with the reduced frequencies are output from the output terminal 306 in the order of UC0, UC2, UC4, . . . . The frequencies of the data F0, F1, F2, F3, . . . , of the chrominance signal V4 output from the adder 319 are reduced to one fourth, and the data are read from the output terminal 307 in the order of VC0, VC2, VC4 . . . . The intensity signal data DH0, DH1, DH2, DH3, . . . , the chrominance signal data UC0, UC2, UC4, . . . , and VC0, VC2, VC4, . . . , are input to the multiplexer 360c of the following stage, multiplexed into a multiplexed signal M (DH0, UC0, DH1, VC0, DH2, UC2, DH3, VC2, . . . , and transmitted to the vertical filter circuit 400c via a terminal 308.

In the third embodiment, the intensity signal Y and the chrominance signals (B-Y) and (R-Y), which are output from the horizontal averaging circuit 300c, are multiplexed and transmitted to the vertical filter circuit 400c, without using the selector 350, which has been provided in the conventional circuit.

Since the vertical filter circuit 400c can average the intensity signal Y and the chrominance signals (B-Y) and (R-Y) in their multiplexed state, only one delay memory 401 and one adder 402 are needed for averaging the intensity signal Y and the chrominance signals (B-Y) and (R-Y), which makes it possible to save the delay memory. In other words, the multiplexed signal M can be processed in one vertical averaging circuit.

In the third embodiment, since the multiplexed intensity signal Y and the chrominance signal (B-Y) and (R-Y) are output from the vertical filter circuit 400c, only one field memory 500 is required for multiplexing the intensity signal Y and the chrominance signal (B-Y) and (R-Y). In other words, it is not necessary for the field memory 500 to perform write control and read control on the respective intensity signal Y and the chrominance signals (B-Y) and (R-Y), so it is possible to save the memory of the field memory 500. At the same time, the circuit of the third embodiment has separate merit in making the controls of the write controlling circuit 550 and the read controlling circuit simpler.

In addition, since thinning is performed in the horizontal direction on all of the intensity signals Y and the chrominance signals (B-Y) and (R-Y), the capacity of the field memory 500 may be small. Although the conventional circuit has required a memory capacity for three lines, a field memory of the third embodiment only requires a capacity for 1.5 lines, if assuming that the respective signals are thinned to a half.

Embodiment 4

Figure 21:
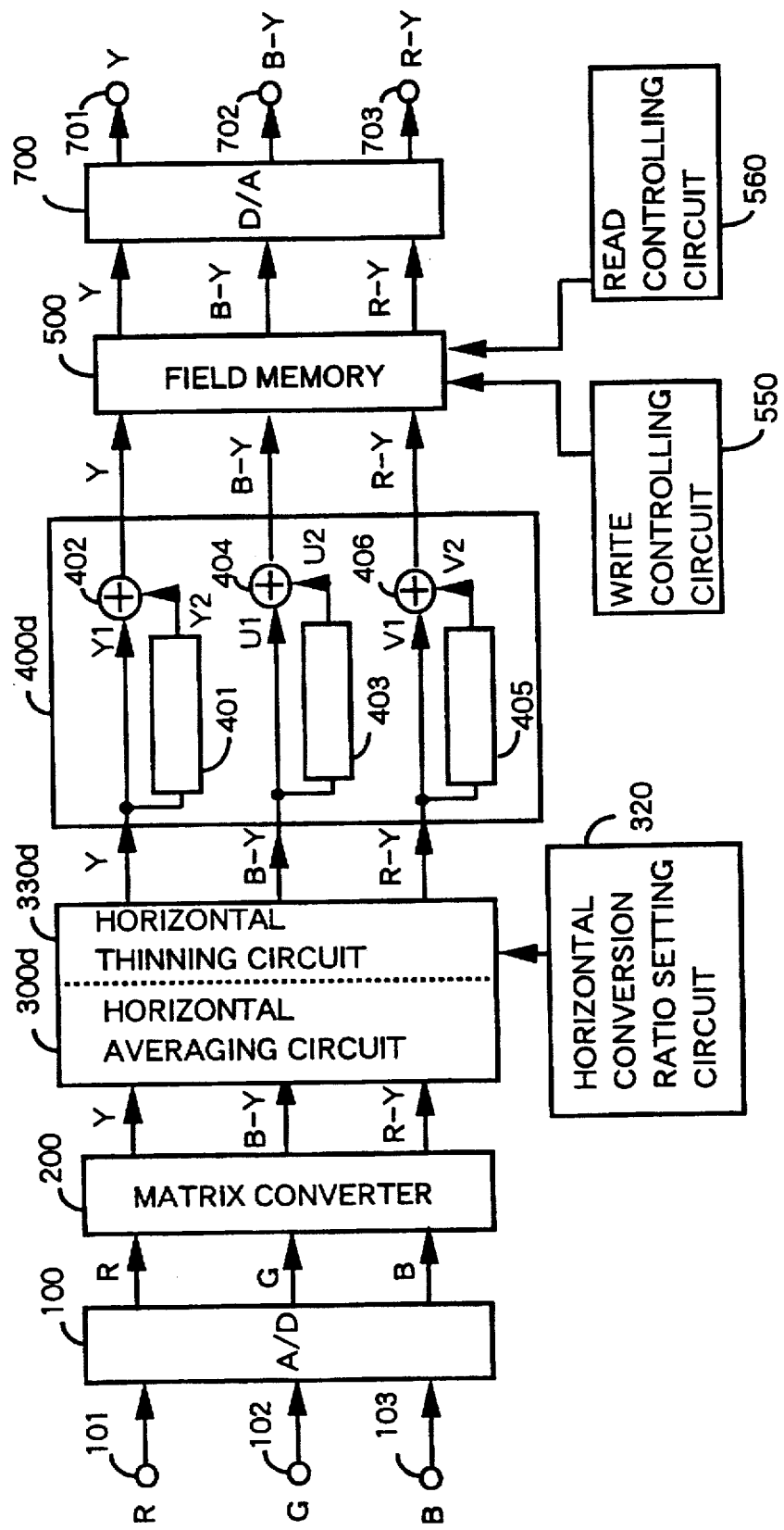
FIG. 21 shows a video system conversion circuit according to a fourth embodiment of the present invention.

FIG. 21 shows a video system conversion circuit according to a fourth embodiment of the present invention. In FIG. 21, an R signal (red signal), a G signal (green signal), and a B signal (blue signal) are input to an analog-to-digital converter 100, and converted from analog form into digital signal. The respective RGB signals, which are converted by the analog-to-digital converter 100, are input to a matrix converter 200. The matrix converter 200 converts the respective digital output RGB signals into an intensity signal Y, and two chrominance signals (B-Y) and (R-Y) of the NTSC system (or the PAL system) which are used in televisions, and are output to a horizontal averaging circuit 300d. The two chrominance signals may be converted according to the I, Q system.

Figure 22:
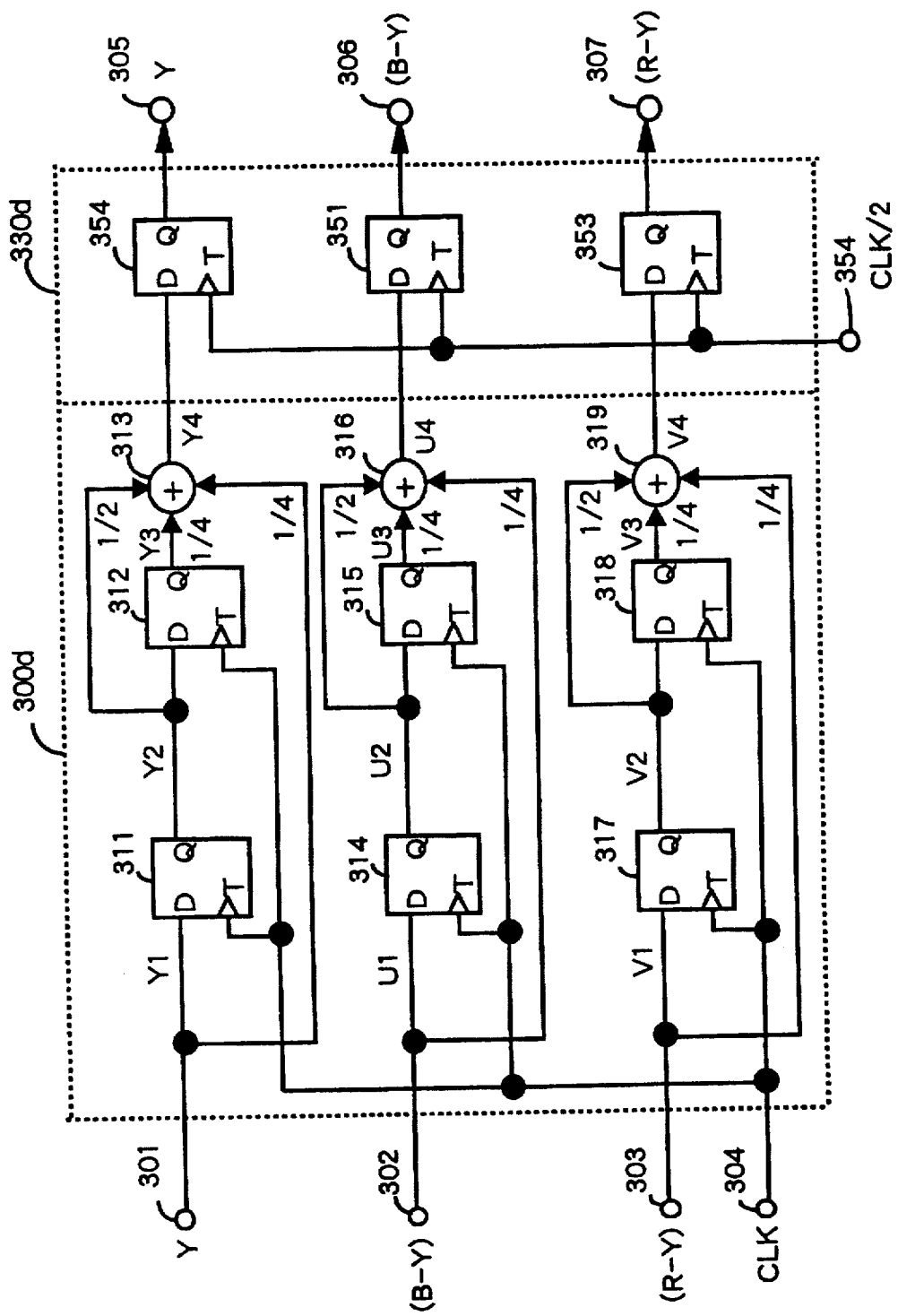
FIG. 22 shows a horizontal averaging circuit and a horizontal thinning circuit according to the fourth embodiment of the present invention.
Figure 23:
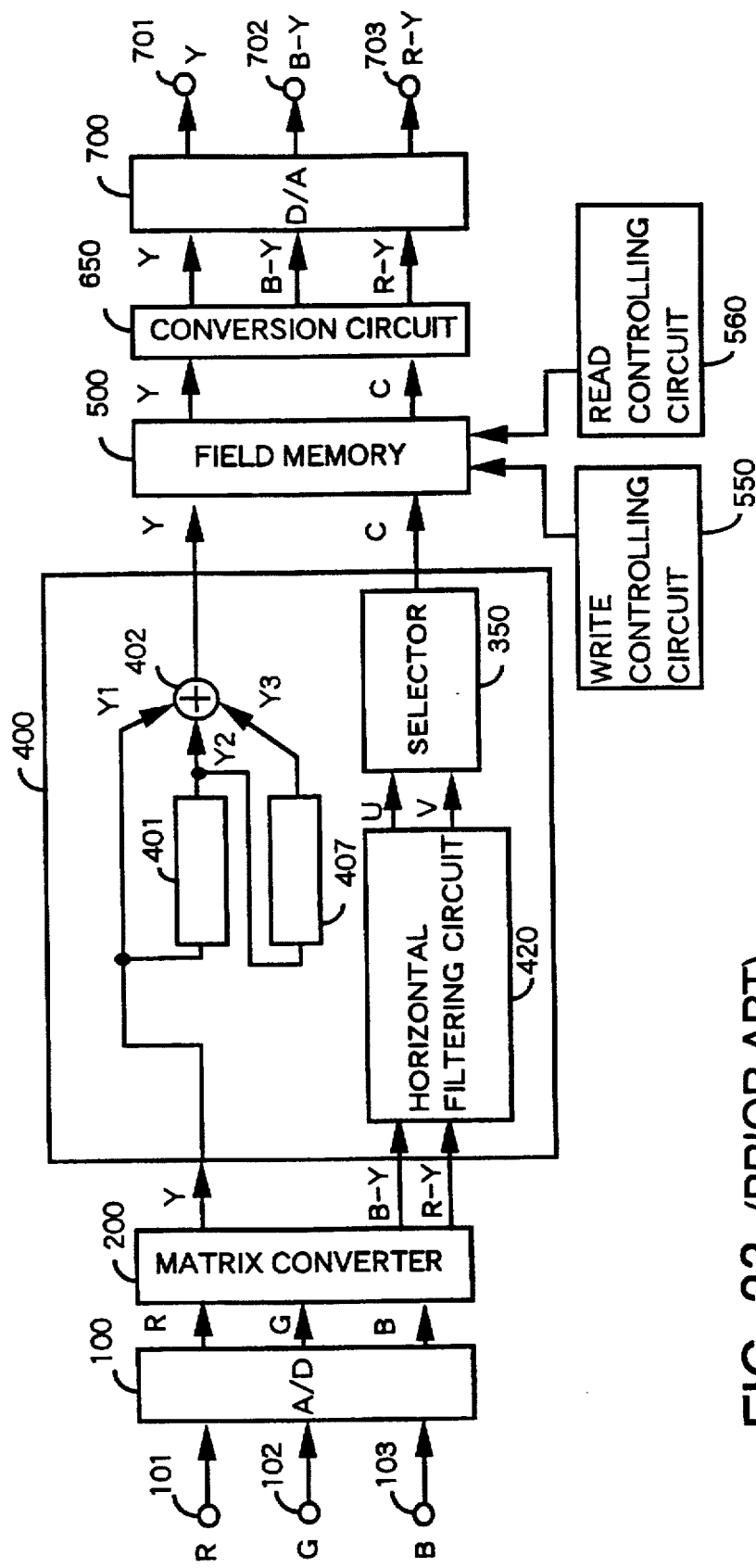
FIG. 23 shows a conventional video system conversion circuit.
Figure 24:
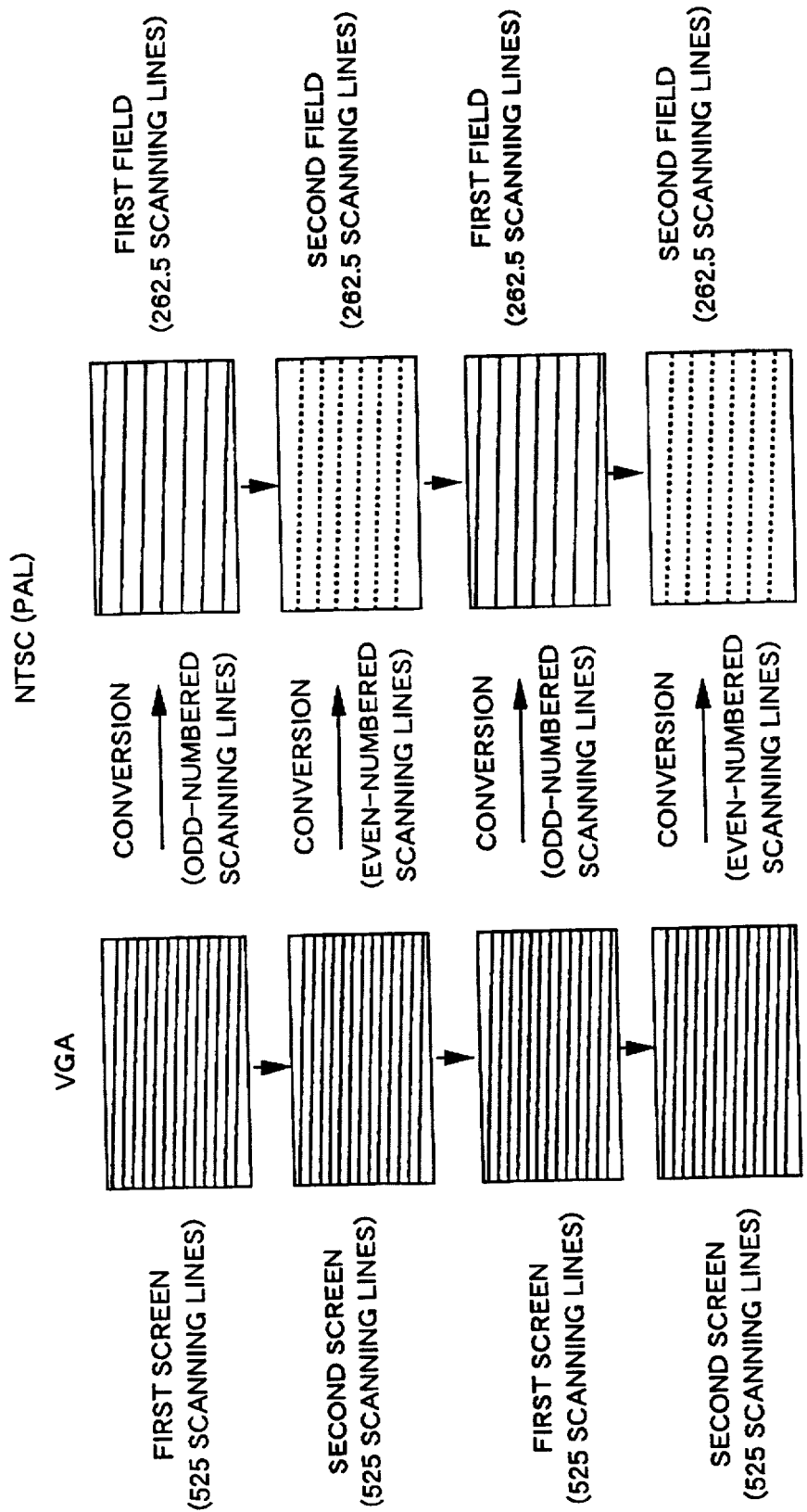
FIG. 24 is a conceptual drawing showing a conversion of video data from the VGA system to the NTSC system.

FIG. 22 shows a horizontal averaging circuit 300d and a horizontal thinning circuit 330d according to the fourth embodiment. In the horizontal averaging circuit 300d of FIG. 22, the intensity signal Y1 of the NTSC system output from the matrix converter 200, is input to a D flip-flop 311 from the terminal 301, in the same manner as in the second embodiment. The D flip-flop 311 delays the intensity signal Y1 by one clock cycle, and outputs a delayed signal Y2. The delayed signal Y2 is input to a D flip-flop 312, delayed, and output as a delayed signal Y3. These input signal Y1, delayed signal Y2, and the delayed signal Y3 are input to an adder 313. The adder 313 adds the three signals Y1, Y2 and Y3, and averages the signals Y1, Y2 and Y3. The calculated average is output as an intensity signal Y from the adder 313 via the terminals 305. In the same manner, the chrominance signals (B-Y) and (R-Y) are averaged, respectively, and the averaged chrominance signals (B-Y) and (R-Y) are output from the terminals 306, 307, respectively.

The delayed signals Y4, U4, and V4 output from the adders 313, 316, and 319 in the horizontal averaging circuit 300d are input to the D flip-flops 354, 351, and 353 located in the horizontal thinning circuit 330d, respectively. The intensity signal Y4 and the chrominance signals (B-Y) and (R-Y) from the adder 313, 316, and 319 are latched during two clock cycles according to ½ frequency clock (CLK/2), and are output from the terminals 305, 306, and 307 as the intensity signal Y and the chrominance signals (B-Y) and (R-Y), respectively. At this time, the thinning operation is performed on the respective intensity signal Y and the chrominance signals (B-Y) and (R-Y). The thinned intensity signal Y and the chrominance signals (B-Y) and (R-Y) are output to the vertical filter circuit 400d, without being multiplexed.

The vertical filter circuit 400d averages the received intensity signal Y and the chrominance signals (B-Y) and (R-Y), respectively, and outputs the averaged intensity signal Y and the chrominance signals (B-Y) and (R-Y) of the NTSC system.

A first averaging circuit including a delay memory 401 and an adder 402, a second averaging circuit including a delay memory 403 and an adder 404, and a third averaging circuit including a delay memory 405 and an adder 406 are the same as the averaging circuit including the delay memory 401 and the adder 402 illustrated in FIG. 1 of the first embodiment, and, therefore, repeated explanation is omitted.

In the fourth embodiment, the intensity signals Y and the chrominance signals (B-Y) and (R-Y) of the NTSC system, which are output from the vertical filter circuit 400d, are stored in the field memory arrays located in the field memory 500 under the control of a write controlling circuit 550, and read from the corresponding field arrays 503 under the control of a read controlling circuit 560, and the intensity signal Y and the chrominance signals (B-Y) and (R-Y) of the NTSC system are output. The construction and the operation of the field memory 500 in the fourth embodiment are the same as those in the third embodiment, therefore, duplicate explanation is omitted. Since the field memory 500 outputs the intensity signal Y and the chrominance signal (B-Y) and (R-Y) in the fourth embodiment, the demultiplexer 600 used in the third embodiment is not necessary in the fourth embodiment.

Figure 17D:
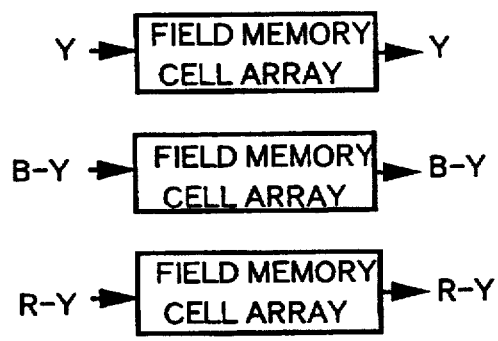

FIG. 17D illustrates the capacity required for the respective field memory cell arrays 503 used in the field memory 500 according to the fourth embodiment. In the fourth embodiment, three field memory cell arrays are required, one for storing the intensity signal Y, and the other two for storing the respective chrominance signals (B-Y) and (R-Y).

The respective outputs of the intensity signal Y and the chrominance signals (B-Y) and (R-Y) of the NTSC system are transmitted to a digital-to-analog converter 700, converted to analog form, and are output to the television set as the intensity signal Y and the chrominance signals (B-Y) and (R-Y) of the NTSC system.

In the fourth embodiment, since vertical and horizontal thinning processes are performed on the intensity signal Y and the chrominance signals (B-Y) and (R-Y), the capacity of the field memory 500 can be small. In the conventional circuit, memory capacity for storing three lines has been required, but in the fourth embodiment of the present invention, assuming that the thinning reduces the scanning lines by half, only half of the field memory is required for the respective chrominance signals (B-Y) and (R-Y), as illustrated in FIG. 17D. Therefore, as a whole, a field memory having the capacity of one and a half lines may be enough. In this manner, the required capacity in the field memory can be reduced.

What is claimed is:

1. A video system conversion method for converting VGA (Video Graphics Array) signals to television signals including converting RGB (Red, Green, Blue) signals from a VGA source into an intensity signal, a first chrominance signal, and a second chrominance signal, and averaging scanning lines of the first and second chrominance signals and the intensity signal in a horizontal direction, and, subsequently, in a vertical direction.

2. The video system conversion method according to claim 1 wherein after the scanning lines of the first and second chrominance signals and the intensity signal are averaged in the horizontal direction, thinning scanning lines of the first chrominance signal and the second chrominance signal, and, subsequently, averaging the first chrominance signal and the second chrominance signal in the vertical direction.

3. The video system conversion method according to claim 1 wherein after the scanning lines are averaged in the horizontal direction, thinning scanning lines of the intensity signal, the first chrominance signal and the second chrominance signal, and then averaging the intensity signal, the first chrominance signal, and the second chrominance signal in the vertical direction.

4. The video system conversion method according to claim 2 further comprising multiplexing the first chrominance signal and the second chrominance signal, after the scanning lines of the first chrominance signal and the second chrominance signal are thinned.

5. The video system conversion method according to claim 3 further comprising multiplexing the intensity signal, the first chrominance signal and the second chrominance signal, after the scanning lines of the first chrominance signal and the second chrominance signal are thinned.

6. A video system conversion circuit for converting VGA signals to television signals including converting RGB signals to an intensity signal, a first chrominance signal and a second chrominance signal wherein after the RGB signals are converted to the intensity signal, the first chrominance signal and the second chrominance signal, the scanning lines are averaged in a horizontal direction, and then averaged in a vertical direction and including a horizontal averaging circuit for averaging horizontal scanning lines comprising:

a first delay circuit for delaying the intensity signal by one clock cycle;

a second delay circuit for delaying the output signal from the first delay circuit by a second clock cycle;

a first adder for adding the input intensity signal, the intensity signal delayed by the first delay circuit, and the intensity signal delayed by the second delay circuit, and for outputting the result as an averaged output;

a third delay circuit for delaying the first chrominance signal by one clock cycle;

a fourth delay circuit for delaying the output signal from the third delay circuit by a second clock cycle;

a second adder for adding the input first chrominance signal, the chrominance signal delayed by the third delay circuit, and the chrominance signal delayed by the fourth delay circuit, and for outputting the result as a first averaged chrominance output;

a fifth delay circuit for delaying the second chrominance signal by one clock cycle;

a sixth delay circuit for delaying the output chrominance signal from the fifth delay circuit by a second clock cycle; and a third adder for adding the input second chrominance signal, the chrominance signal delayed by the fifth delay circuit and the chrominance signal delayed by the sixth delay circuit, and for outputting the result as a second averaged chrominance output.

7. The video system conversion circuit according to claim 6 further comprising a thinning circuit, the thinning circuit comprising:

a seventh delay circuit for latching the output of the second adder for two clock cycles; and an eighth second delay circuit for latching the output of the third adder for two clock cycles.

8. The video system conversion circuit according to claim 6 further comprising a thinning circuit, the thinning circuit comprising:

a seventh delay circuit for latching the output of the second adder for two clock cycles;

an eighth delay circuit for latching the output of the third adder for four clock cycles; and a ninth delay circuit for latching the output of the first adder for four clocks cycles.

9. The video system conversion circuit according to claim 7 wherein the thinning circuit comprises a clock circuit having a two times frequency divider and a four times frequency divider.

10. The video system conversion circuit according to claim 8 wherein the thinning circuit comprises a clock circuit having a two times frequency divider and a four times frequency divider.

11. The video system conversion circuit according to claim 7 further comprising:

a multiplexer for multiplexing the first chrominance signal and the second chrominance signal, after the scanning lines of the first chrominance signal and the second chrominance signal are thinned;

a first vertical averaging circuit for averaging the intensity signal; and a second vertical averaging circuit for averaging the multiplexed first and second chrominance signals.

12. The video system conversion circuit according to claim 7 further comprising:

a multiplexer for multiplexing the first chrominance signal and the second chrominance signal, after the scanning lines of the first chrominance signal and the second chrominance signal are thinned; and a vertical averaging circuit for averaging the intensity signal, and the multiplexed first and second chrominance signals.

13. The video system conversion circuit according to claim 6 further comprising:

a first vertical averaging circuit for averaging the intensity signal;

a second vertical averaging circuit for averaging the first chrominance signal; and a third vertical averaging circuit for averaging the second chrominance signal.

14. The video system conversion circuit according to claim 11 further comprising first and second field memories respectively corresponding to first and second vertical averaging circuits.

15. The video system conversion circuit according to claim 12 further comprising a single field memory corresponding to the vertical averaging circuit.

16. The video system conversion circuit according to claim 13 further comprising first, second, and third field memories respectively corresponding to the first, second, and third vertical averaging circuits.

17. The video system conversion method according to claim 1 wherein averaging scanning lines of the first and second chrominance signals includes:

delaying the first and second chrominance signals by a first number of clock pulses to produce delayed first and second chrominance signals; and adding the delayed first and second chrominance signals to the first and second chrominance signals to produce first and second average chrominance signals.

18. The method of claim 17 wherein adding the delayed first and second chrominance signals to the first and second chrominance signals includes weighting the delayed first and second chrominance signals with a first weighting factor and weighting the first and second chrominance signals with a second weighting factor, the first weighting factor being different from the second weighting factor, to produce the first and second average chrominance signals.

19. The video system conversion method according to claim 17 wherein thinning scanning lines of the first and second chrominance signals comprises inputting the first and second average chrominance signals into first and second sampling circuits at a first clock rate and sampling the first and second average chrominance signals at a second clock rate, lower than the first clock rate.

20. The video system conversion method according to claim 18 wherein thinning scanning lines of the first and second chrominance signals comprises inputting the first and second average chrominance signals into first and second sampling circuits at a first clock rate and sampling the first and second average chrominance signals at a second clock rate, lower than the first clock rate.

* * * * *